(12) United States Patent
Wahl et al.

(10) Patent No.: US 9,883,679 B2
(45) Date of Patent: Feb. 6, 2018

(54) BISCUIT DOUGH

(75) Inventors: Robin Wahl, Chevreuse (FR); Agathe Arlotti, Paris (FR); Lionel Lanvin, Chilly Mazarin (FR); Pierre Aymard, Antony (FR)

(73) Assignee: Generale Biscuit (FR)

( * ) Notice: Subject to any disclaimer, the term of this patent is extended or adjusted under 35 U.S.C. 154(b) by 0 days.

(21) Appl. No.: 14/127,659

(22) PCT Filed: Jun. 20, 2012

(86) PCT No.: PCT/EP2012/061891
§ 371 (c)(1),
(2), (4) Date: Mar. 24, 2014

(87) PCT Pub. No.: WO2012/120156
PCT Pub. Date: Sep. 13, 2012

(65) Prior Publication Data
US 2014/0220186 A1    Aug. 7, 2014

Related U.S. Application Data

(60) Provisional application No. 61/498,986, filed on Jun. 20, 2011.

(30) Foreign Application Priority Data

Jun. 20, 2011   (EP) .................................... 11290278
Jun. 20, 2011   (EP) .................................... 11290279

(51) Int. Cl.
*A21D 13/00* (2017.01)
*A21D 8/02* (2006.01)
(Continued)

(52) U.S. Cl.
CPC ................ *A21D 8/02* (2013.01); *A21C 5/003* (2013.01); *A21D 2/186* (2013.01); *A21D 8/06* (2013.01);
(Continued)

(58) Field of Classification Search
CPC .... A21D 13/062; A21D 2/186; A21D 10/002; A21D 8/02; A21D 13/19; A21D 13/40;
(Continued)

(56) References Cited

U.S. PATENT DOCUMENTS 3,050,017 A    8/1962   Mahler
4,229,487 A    10/1980  Crothers
(Continued)

FOREIGN PATENT DOCUMENTS

CA    2141974      8/1995
CA    2141974 A    8/1995
(Continued)

OTHER PUBLICATIONS

International Patent Application No. PCT/EP2012/061891, International Search Report and Written Opinion, dated Sep. 14, 2012, 7 pages.
(Continued)

*Primary Examiner* — Katherine D LeBlanc
(74) *Attorney, Agent, or Firm* — Morgan, Lewis & Bockius LLP

(57) ABSTRACT

The present disclosure relates to a dough for producing a biscuit having a slowly-digestible-starch-over-total-available-starch ratio of at least 31%, the biscuit comprising at least 29 wt % cereal flour, 5 to 22 wt % fat and at most 30 wt % sugar relative to the total weight of the biscuit, the dough comprising: cereal flour, fat, sugar and added water; and wherein the added water is in an amount of at most 8 wt % relative to the weight of dough.

24 Claims, 3 Drawing Sheets

(51) Int. Cl.

| | | |
|---|---|---|
| *A21D 13/40* | (2017.01) | |
| *A21D 13/02* | (2006.01) | |
| *A21D 13/04* | (2017.01) | |
| *A21D 13/062* | (2017.01) | |
| *A21D 2/18* | (2006.01) | |
| *A21D 10/00* | (2006.01) | |
| *A21C 5/00* | (2006.01) | |
| *A21D 8/06* | (2006.01) | |
| *A23L 29/225* | (2016.01) | |
| *A23L 7/10* | (2016.01) | |
| *A21D 13/80* | (2017.01) | |
| *A21D 13/22* | (2017.01) | |
| *A21D 13/19* | (2017.01) | |

(52) U.S. Cl.
CPC ........... *A21D 10/002* (2013.01); *A21D 13/02* (2013.01); *A21D 13/04* (2013.01); *A21D 13/062* (2013.01); *A21D 13/19* (2017.01); *A21D 13/22* (2017.01); *A21D 13/40* (2017.01); *A21D 13/80* (2017.01); *A23L 7/115* (2016.08); *A23L 7/198* (2016.08); *A23L 29/225* (2016.08)

(58) Field of Classification Search
CPC .......... A21D 13/22; A21D 13/80; A21D 8/06; A21D 13/02; A21D 13/04; A23L 7/198; A23L 7/115; A23L 29/225; A21C 5/003
See application file for complete search history.

(56) References Cited

U.S. PATENT DOCUMENTS

| | | | |
|---|---|---|---|
| 4,496,606 A | 1/1985 | Michnowski | |
| 4,543,262 A | 9/1985 | Michnowski | |
| 4,563,363 A | 1/1986 | Yoon | |
| 4,623,550 A * | 11/1986 | Willard | 426/559 |
| 4,894,246 A | 1/1990 | Dartey et al. | |
| 4,925,693 A | 5/1990 | Lauly | |
| 4,961,937 A | 10/1990 | Rudel | |
| 5,014,885 A | 5/1991 | Heep et al. | |
| 5,071,668 A | 12/1991 | Van Lengerich et al. | |
| 5,286,513 A | 2/1994 | Fuisz | |
| 5,292,723 A | 3/1994 | Audry et al. | |
| 5,356,644 A | 10/1994 | Hendrick et al. | |
| 5,382,443 A | 1/1995 | Kincaid et al. | |
| 5,389,395 A | 2/1995 | Joseph et al. | |
| 5,419,903 A | 5/1995 | Evans et al. | |
| 5,447,743 A | 9/1995 | Dvir et al. | |
| 5,472,731 A | 12/1995 | Fuisz | |
| 5,480,669 A | 1/1996 | Zallie et al. | |
| 5,492,710 A | 2/1996 | Seyam | |
| 5,573,793 A | 11/1996 | Saintain | |
| 5,601,863 A | 2/1997 | Borden et al. | |
| 5,603,975 A | 2/1997 | Fontana | |
| 5,605,893 A | 2/1997 | Kaufman | |
| 5,620,871 A | 4/1997 | Caboche | |
| 5,624,684 A | 4/1997 | Fuisz | |
| 5,659,000 A | 8/1997 | Cain et al. | |
| 5,681,601 A | 10/1997 | Hendrick et al. | |
| 5,688,548 A | 11/1997 | Gaither et al. | |
| 5,709,896 A | 1/1998 | Hartigan et al. | |
| 5,714,600 A | 2/1998 | McNaught et al. | |
| 5,776,887 A | 7/1998 | Wilbert et al. | |
| 5,843,921 A | 12/1998 | Kaufman | |
| 5,849,090 A | 12/1998 | Haralampu et al. | |
| 5,866,555 A | 2/1999 | Bell et al. | |
| 5,888,564 A | 3/1999 | Fontana | |
| 5,902,797 A | 5/1999 | Bell et al. | |
| 5,906,852 A | 5/1999 | Klemann et al. | |
| 5,932,269 A | 8/1999 | Huang et al. | |
| 5,962,047 A | 10/1999 | Gross et al. | |
| 6,001,399 A | 12/1999 | Kilibwa | |
| 6,024,997 A | 2/2000 | Blaschke et al. | |
| 6,249,972 B1 | 2/2000 | Blaschke et al. | |
| 6,043,229 A | 3/2000 | Kettlitz et al. | |
| 6,048,564 A | 4/2000 | Young et al. | |
| 6,090,594 A | 7/2000 | Kettlitz et al. | |
| 6,103,279 A | 8/2000 | Ferrero | |
| 6,110,511 A | 8/2000 | Rollins et al. | |
| 6,139,884 A | 10/2000 | Shifferaw et al. | |
| 6,149,965 A | 11/2000 | van Lengerich et al. | |
| 6,165,524 A | 12/2000 | Narayanaswamy et al. | |
| 6,197,361 B1 | 3/2001 | Anantharaman et al. | |
| 6,214,402 B1 | 4/2001 | Fotos et al. | |
| 6,217,930 B1 | 4/2001 | Kilibwa | |
| 6,221,418 B1 | 4/2001 | Bergenfield et al. | |
| 6,280,782 B1 | 8/2001 | Hahn et al. | |
| 6,303,174 B1 | 10/2001 | McNaught et al. | |
| 6,339,076 B1 | 1/2002 | Kaufman | |
| 6,419,979 B1 | 1/2002 | Nelson et al. | |
| 6,352,733 B1 | 3/2002 | Haynes et al. | |
| 6,379,723 B1 | 4/2002 | Samuelsson | |
| 6,451,121 B2 | 9/2002 | Chiu et al. | |
| 6,451,367 B1 | 9/2002 | McNaught et al. | |
| 6,458,405 B1 | 10/2002 | Roy et al. | |
| 6,488,957 B1 | 12/2002 | Koumarianos | |
| 6,534,487 B1 | 3/2003 | Kaufman | |
| 6,537,599 B2 | 3/2003 | Taylor et al. | |
| 6,558,718 B1 | 5/2003 | Evenson et al. | |
| 6,569,483 B2 | 5/2003 | Zohoungbogbo | |
| 6,613,373 B2 | 9/2003 | Haynes et al. | |
| 6,623,943 B2 | 9/2003 | Schmiedel et al. | |
| 6,664,389 B1 | 12/2003 | Shi et al. | |
| 6,706,305 B2 | 3/2004 | Wolt et al. | |
| 6,716,462 B2 | 4/2004 | Prosise et al. | |
| 6,720,015 B2 | 4/2004 | Prosise et al. | |
| 6,723,358 B1 | 4/2004 | van Lengerich | |
| 6,726,943 B2 | 4/2004 | Prosise et al. | |
| 6,733,769 B1 | 5/2004 | Ryan et al. | |
| 6,759,070 B1 * | 7/2004 | Narayanaswamy et al. | 426/128 |
| 6,808,733 B2 | 10/2004 | Barndt et al. | |
| 6,821,547 B2 | 11/2004 | Shah et al. | |
| 6,827,954 B2 | 12/2004 | Prosise et al. | |
| 6,837,682 B2 | 1/2005 | Evenson et al. | |
| 6,838,107 B1 | 1/2005 | Bakal et al. | |
| 6,846,501 B2 | 1/2005 | Prosise et al. | |
| 6,890,571 B2 | 5/2005 | Shi et al. | |
| 6,905,702 B1 | 6/2005 | Kaufman | |
| 6,913,775 B2 | 7/2005 | Ballman et al. | |
| 6,929,815 B2 | 8/2005 | Bengs et al. | |
| 6,929,817 B2 | 8/2005 | Shi et al. | |
| 6,942,885 B2 | 9/2005 | Ross et al. | |
| 6,984,407 B2 | 1/2006 | Wolt et al. | |
| 7,074,445 B2 | 7/2006 | Barber et al. | |
| 7,097,831 B1 | 8/2006 | Bengs et al. | |
| 7,097,870 B2 | 8/2006 | Funk et al. | |
| 7,138,154 B2 | 11/2006 | Brendel et al. | |
| 7,166,313 B2 | 1/2007 | Diddle et al. | |
| 7,169,417 B2 | 1/2007 | Dibble et al. | |
| 7,189,288 B2 | 3/2007 | Stanley et al. | |
| 7,201,923 B1 | 4/2007 | van Lengerich | |
| 7,235,276 B2 | 6/2007 | Allen et al. | |
| 7,252,847 B2 | 8/2007 | Keller et al. | |
| 7,329,429 B2 | 2/2008 | Chimel et al. | |
| 7,396,555 B2 | 7/2008 | Baumgartner et al. | |
| 7,425,344 B2 | 9/2008 | Korolchuk et al. | |
| 7,507,431 B2 | 3/2009 | Faa et al. | |
| 7,531,199 B2 | 5/2009 | Haynes et al. | |
| 7,585,536 B2 | 9/2009 | Silver | |
| 7,592,026 B2 | 9/2009 | Hartmann et al. | |
| 7,595,075 B2 | 9/2009 | Lang et al. | |
| 7,595,081 B1 | 9/2009 | Bellar | |
| 7,605,254 B2 | 10/2009 | McClain | |
| 7,629,008 B2 | 12/2009 | Coleman et al. | |
| 7,648,723 B2 | 1/2010 | Zimeri et al. | |
| 7,700,139 B2 | 4/2010 | Bird et al. | |
| 7,700,327 B2 | 4/2010 | King et al. | |
| 7,704,535 B2 | 4/2010 | Zhang et al. | |
| 7,727,975 B2 | 6/2010 | Chang et al. | |
| 7,744,944 B2 | 6/2010 | Binder et al. | |
| 7,812,004 B2 | 10/2010 | Frippiat et al. | |
| 7,829,128 B2 | 11/2010 | Karwowski et al. | |

(56) References Cited

U.S. PATENT DOCUMENTS

| | | |
|---|---|---|
| 7,867,533 B2 | 1/2011 | Bows et al. |
| 7,867,546 B2 | 1/2011 | Hirano et al. |
| 7,910,150 B2 | 3/2011 | Matsuda et al. |
| 7,919,134 B2 | 4/2011 | Froseth et al. |
| 7,927,640 B2 | 4/2011 | Lang et al. |
| 7,935,372 B2 | 5/2011 | Slegers et al. |
| 7,947,320 B2 | 5/2011 | Faa et al. |
| 7,959,962 B2 | 6/2011 | Hellwege et al. |
| 7,964,232 B2 | 6/2011 | Lee |
| 7,993,686 B2 | 8/2011 | Bird et al. |
| 8,017,172 B2 | 9/2011 | Arndt et al. |
| 8,057,833 B2 | 11/2011 | David et al. |
| 8,076,473 B2 | 12/2011 | Berckmans et al. |
| 8,080,273 B2 | 12/2011 | Lykomitros et al. |
| 8,088,431 B2 | 1/2012 | Ward et al. |
| 8,128,977 B2 | 3/2012 | Anfinsen et al. |
| 8,161,532 B2 | 4/2012 | Sebesta et al. |
| 8,163,150 B2 | 4/2012 | Vann et al. |
| 8,163,324 B2 | 4/2012 | Zimeri et al. |
| 8,163,715 B2 | 4/2012 | Meuser et al. |
| 8,168,244 B2 | 5/2012 | Bashor |
| 8,193,341 B2 | 6/2012 | Meuser et al. |
| 8,221,808 B2 | 7/2012 | Lang et al. |
| 8,221,810 B2 | 7/2012 | Allen et al. |
| 8,227,448 B2 | 7/2012 | Van Laere et al. |
| 8,252,360 B2 | 8/2012 | Arndt et al. |
| 8,257,773 B2 | 9/2012 | Froseth et al. |
| 8,313,757 B2 | 11/2012 | van Lengerich |
| 8,354,134 B2 | 1/2013 | Atwell et al. |
| 8,361,532 B2 | 1/2013 | David et al. |
| 8,367,137 B2 | 2/2013 | Prakash et al. |
| 8,367,138 B2 | 2/2013 | Prakash et al. |
| 8,367,139 B2 | 2/2013 | Haynes et al. |
| 8,372,466 B2 | 2/2013 | Mingus et al. |
| 8,377,491 B2 | 2/2013 | Prakash et al. |
| 8,414,954 B2 | 4/2013 | Nowakowski et al. |
| 8,420,116 B2 | 4/2013 | Ivie et al. |
| 8,431,618 B2 | 4/2013 | Endo et al. |
| 8,435,587 B2 | 5/2013 | Prakash et al. |
| 8,435,588 B2 | 5/2013 | Prakash et al. |
| 8,535,588 B2 | 5/2013 | Prakash et al. |
| 8,465,785 B2 | 6/2013 | Anfinsen et al. |
| 8,470,149 B2 | 6/2013 | Vann et al. |
| 8,501,262 B2 | 8/2013 | Bird et al. |
| 8,512,777 B2 | 8/2013 | Fritzsching et al. |
| 8,512,789 B2 | 8/2013 | Prakash et al. |
| 8,524,303 B2 | 9/2013 | Prakash et al. |
| 8,524,304 B2 | 9/2013 | Prakash et al. |
| 8,541,044 B1 | 9/2013 | Johnson et al. |
| 8,563,065 B2 | 10/2013 | Zimeri et al. |
| 8,568,820 B2 | 11/2013 | Stahl et al. |
| 8,580,327 B2 | 11/2013 | Cross et al. |
| 8,586,113 B2 | 11/2013 | Carder et al. |
| 8,591,919 B2 | 11/2013 | Stahl et al. |
| 8,597,704 B2 | 12/2013 | Bashor |
| 8,613,971 B2 | 12/2013 | Finocchiaro et al. |
| 8,617,635 B2 | 12/2013 | Hanselmann |
| 8,642,110 B2 | 2/2014 | Abrahamse et al. |
| 8,652,557 B2 | 2/2014 | Mingus et al. |
| 8,734,873 B2 | 5/2014 | Boice et al. |
| 8,741,370 B2 | 6/2014 | Ganjyal et al. |
| 8,759,645 B2 | 6/2014 | Frohberg et al. |
| 8,779,009 B2 | 7/2014 | Williams et al. |
| 8,790,740 B2 | 7/2014 | Nagahata et al. |
| 8,791,253 B2 | 7/2014 | Prakash et al. |
| 8,815,319 B2 | 8/2014 | Zapp Glauser et al. |
| 8,828,472 B2 | 9/2014 | Martinsen |
| 8,835,716 B2 | 9/2014 | Frohberg |
| 8,927,044 B2 | 1/2015 | Lopez et al. |
| 8,940,350 B2 | 1/2015 | Prakash et al. |
| 8,945,652 B2 | 2/2015 | Prakash et al. |
| 8,956,677 B2 | 2/2015 | Prakash et al. |
| 8,956,679 B2 | 2/2015 | Okoniewska et al. |
| 8,962,058 B2 | 2/2015 | Prakash et al. |
| 8,993,027 B2 | 3/2015 | Prakash et al. |
| 9,011,956 B2 | 4/2015 | Prakash et al. |
| 9,012,626 B2 | 4/2015 | Prakash et al. |
| 9,034,411 B2 | 5/2015 | Johnson et al. |
| 9,044,446 B2 | 6/2015 | Van Der Beek et al. |
| 9,089,153 B2 | 7/2015 | Cross et al. |
| 9,101,160 B2 | 8/2015 | Prakash et al. |
| 2002/0119238 A1 | 8/2002 | Pires |
| 2002/0150649 A1 | 10/2002 | Bell |
| 2002/0197372 A1 | 12/2002 | Janssen et al. |
| 2002/0197373 A1 | 12/2002 | Shi et al. |
| 2003/0045504 A1 | 3/2003 | Brown et al. |
| 2003/0059458 A1 | 3/2003 | Haber et al. |
| 2003/0113429 A1 | 6/2003 | McNaught et al. |
| 2003/0138520 A1 | 7/2003 | Bell et al. |
| 2003/0143287 A1 | 7/2003 | Bell |
| 2003/0161861 A1 | 8/2003 | Lang et al. |
| 2004/0022916 A1 | 2/2004 | Atwell et al. |
| 2004/0047950 A1 | 3/2004 | Gambino et al. |
| 2004/0048829 A1 | 3/2004 | Hausmanns et al. |
| 2004/0058050 A1 | 3/2004 | Guo |
| 2004/0058890 A1 | 3/2004 | Brown et al. |
| 2004/0109922 A1 | 6/2004 | Thai et al. |
| 2004/0137112 A1 | 7/2004 | Katz et al. |
| 2004/0185149 A1 | 9/2004 | Prosise et al. |
| 2004/0191393 A1 | 9/2004 | Sudha et al. |
| 2004/0197379 A1 | 10/2004 | Ryan et al. |
| 2004/0202772 A1 | 10/2004 | Matsuda et al. |
| 2004/0219280 A1 | 11/2004 | Green et al. |
| 2004/0234663 A1 | 11/2004 | Motoi et al. |
| 2004/0241313 A1 | 12/2004 | Nana et al. |
| 2004/0265360 A1 | 12/2004 | Venturi |
| 2005/0013900 A1 | 1/2005 | Dohl et al. |
| 2005/0031754 A1 | 2/2005 | Maningat et al. |
| 2005/0031755 A1 | 2/2005 | Maningat et al. |
| 2005/0031756 A1 | 2/2005 | Maningat et al. |
| 2005/0037125 A1 | 2/2005 | Maningat et al. |
| 2005/0058759 A1 | 3/2005 | Schmidt |
| 2005/0064080 A1 | 3/2005 | Creighton et al. |
| 2005/0079247 A1 | 4/2005 | Slilaty |
| 2005/0129823 A1 | 6/2005 | Dohl et al. |
| 2005/0186306 A1 | 8/2005 | Sonneveld et al. |
| 2005/0226960 A1 | 10/2005 | Boice et al. |
| 2005/0244910 A1 | 11/2005 | Wolever et al. |
| 2005/0260302 A1 | 11/2005 | Prosise |
| 2005/0271793 A1 | 12/2005 | Carmosino |
| 2005/0276896 A1 | 12/2005 | Sadek et al. |
| 2006/0013934 A1 | 1/2006 | Villagran et al. |
| 2006/0013940 A1 | 1/2006 | Mueller et al. |
| 2006/0034993 A1 | 2/2006 | Saelzer |
| 2006/0073240 A1 | 4/2006 | Mingus et al. |
| 2006/0073258 A1 | 4/2006 | Korolchuk |
| 2006/0083795 A1 | 4/2006 | Shatkina et al. |
| 2006/0093720 A1 | 5/2006 | Tatz |
| 2006/0102477 A1 | 5/2006 | Vann et al. |
| 2006/0147500 A1 | 7/2006 | Klingeberg et al. |
| 2006/0159724 A1 | 7/2006 | Bell |
| 2006/0188631 A1 | 8/2006 | Woo et al. |
| 2006/0188644 A1 | 8/2006 | Sault et al. |
| 2006/0198936 A1 | 9/2006 | Manirath et al. |
| 2006/0210695 A1 | 9/2006 | Ganjyal et al. |
| 2006/0210696 A1 | 9/2006 | Liu et al. |
| 2006/0228461 A1 | 10/2006 | Morgan |
| 2006/0233846 A1 | 10/2006 | Morgan |
| 2006/0246198 A1 | 11/2006 | Mingus et al. |
| 2006/0257490 A1 | 11/2006 | Cremer et al. |
| 2006/0257977 A1 | 11/2006 | Hamaker et al. |
| 2006/0263503 A1 | 11/2006 | Okoniewska et al. |
| 2006/0286240 A1 | 12/2006 | Roosjen |
| 2006/0286248 A1 | 12/2006 | Anfinsen et al. |
| 2006/0286286 A1 | 12/2006 | Holzer et al. |
| 2007/0010480 A1 | 1/2007 | Rusing et al. |
| 2007/0042099 A1 | 2/2007 | Stanton |
| 2007/0042103 A1 | 2/2007 | Cho |
| 2007/0042104 A1 | 2/2007 | Cho |
| 2007/0042106 A1 | 2/2007 | Wagner et al. |
| 2007/0042107 A1 | 2/2007 | Kenneth et al. |
| 2007/0042992 A1 | 2/2007 | Frippiat et al. |
| 2007/0054024 A1 | 3/2007 | De Man |
| 2007/0059421 A1 | 3/2007 | Catani et al. |

(56) References Cited

U.S. PATENT DOCUMENTS

| | | |
|---|---|---|
| 2007/0065557 A1 | 3/2007 | Pandey et al. |
| 2007/0082029 A1 | 4/2007 | Aimutis et al. |
| 2007/0082030 A1 | 4/2007 | Aimutis et al. |
| 2007/0082092 A1 | 4/2007 | David et al. |
| 2007/0082104 A1 | 4/2007 | De Baets |
| 2007/0082109 A1 | 4/2007 | Muller et al. |
| 2007/0087107 A1 | 4/2007 | Borders et al. |
| 2007/0098865 A1 | 5/2007 | Hosokawa |
| 2007/0104855 A1 | 5/2007 | Arndt et al. |
| 2007/0110869 A1 | 5/2007 | Horstmann et al. |
| 2007/0110870 A1 | 5/2007 | Golaszewski et al. |
| 2007/0116800 A1 | 5/2007 | Prakash et al. |
| 2007/0116820 A1 | 5/2007 | Prakash et al. |
| 2007/0116821 A1 | 5/2007 | Prakash et al. |
| 2007/0116822 A1 | 5/2007 | Prakash et al. |
| 2007/0116823 A1 | 5/2007 | Prakash et al. |
| 2007/0116825 A1 | 5/2007 | Prakash et al. |
| 2007/0116827 A1 | 5/2007 | Prakash et al. |
| 2007/0116828 A1 | 5/2007 | Prakash et al. |
| 2007/0116829 A1 | 5/2007 | Prakash et al. |
| 2007/0116832 A1 | 5/2007 | Prakash et al. |
| 2007/0116833 A1 | 5/2007 | Prakash et al. |
| 2007/0116834 A1 | 5/2007 | Prakash et al. |
| 2007/0116836 A1 | 5/2007 | Prakash et al. |
| 2007/0116838 A1 | 5/2007 | Prakash et al. |
| 2007/0116839 A1 | 5/2007 | Prakash et al. |
| 2007/0116840 A1 | 5/2007 | Prakash et al. |
| 2007/0122529 A1 | 5/2007 | Thai et al. |
| 2007/0128311 A1 | 6/2007 | Prakash et al. |
| 2007/0128340 A1 | 6/2007 | Andrews et al. |
| 2007/0134391 A1 | 6/2007 | Prakash et al. |
| 2007/0134392 A1 | 6/2007 | Muller et al. |
| 2007/0141096 A1 | 6/2007 | Van Lengerich |
| 2007/0148324 A1 | 6/2007 | Lin et al. |
| 2007/0154609 A1 | 7/2007 | Ballwin et al. |
| 2007/0166446 A1 | 7/2007 | Boursier et al. |
| 2007/0178204 A1 | 8/2007 | Savul et al. |
| 2007/0196437 A1 | 9/2007 | Hansen et al. |
| 2007/0207240 A1 | 9/2007 | Hansen et al. |
| 2007/0207248 A1 | 9/2007 | Seneci |
| 2007/0212453 A1 | 9/2007 | Niness et al. |
| 2007/0212475 A1 | 9/2007 | Augustin et al. |
| 2007/0218167 A1 | 9/2007 | Bhatia et al. |
| 2007/0224321 A1 | 9/2007 | Prakash et al. |
| 2007/0269579 A1 | 11/2007 | Mingus et al. |
| 2007/0269580 A1 | 11/2007 | Werstak |
| 2007/0275147 A1 | 11/2007 | Prakash et al. |
| 2007/0292583 A1* | 12/2007 | Haynes et al. ................ 426/549 |
| 2007/0298152 A1 | 12/2007 | De Baets |
| 2008/0003340 A1 | 1/2008 | Karwowski et al. |
| 2008/0020121 A1 | 1/2008 | Dohl et al. |
| 2008/0038442 A1 | 2/2008 | Peterson et al. |
| 2008/0050493 A1 | 2/2008 | Faa et al. |
| 2008/0057108 A1 | 3/2008 | Koyazounda et al. |
| 2008/0057157 A1 | 3/2008 | Almeida et al. |
| 2008/0085354 A1 | 4/2008 | Paeschke et al. |
| 2008/0089978 A1 | 4/2008 | Grigg et al. |
| 2008/0089981 A1 | 4/2008 | Butler et al. |
| 2008/0107779 A1 | 5/2008 | Kelvin |
| 2008/0124427 A1 | 5/2008 | Schafe et al. |
| 2008/0138472 A1 | 6/2008 | Alexandre |
| 2008/0152779 A1 | 6/2008 | De Groote et al. |
| 2008/0193596 A1 | 8/2008 | Hausmanns et al. |
| 2008/0206404 A1 | 8/2008 | Green et al. |
| 2008/0213456 A1 | 9/2008 | Chimel et al. |
| 2008/0226807 A1 | 9/2008 | Lotz et al. |
| 2008/0233260 A1 | 9/2008 | Woo et al. |
| 2008/0280003 A1 | 11/2008 | Coyle et al. |
| 2008/0286410 A1 | 11/2008 | Richmond et al. |
| 2008/0299258 A1 | 12/2008 | Roman et al. |
| 2008/0300400 A1 | 12/2008 | Berckmans et al. |
| 2008/0305223 A1 | 12/2008 | Cross et al. |
| 2008/0317932 A1 | 12/2008 | Long et al. |
| 2009/0011990 A1 | 1/2009 | Bouritius et al. |
| 2009/0017168 A1 | 1/2009 | Treece et al. |
| 2009/0029008 A1 | 1/2009 | Vanos et al. |
| 2009/0053379 A1 | 2/2009 | Kimura et al. |
| 2009/0123597 A1 | 5/2009 | Williams et al. |
| 2009/0148563 A1 | 6/2009 | Schuette et al. |
| 2009/0162499 A1 | 6/2009 | McArdle et al. |
| 2009/0169683 A1 | 7/2009 | Findlay |
| 2009/0202697 A1 | 8/2009 | Erickson et al. |
| 2009/0214718 A1 | 8/2009 | Leusner |
| 2009/0220649 A1 | 9/2009 | Ryan |
| 2009/0220654 A1 | 9/2009 | Kino et al. |
| 2009/0092706 A1 | 10/2009 | van der Hejden et al. |
| 2009/0246318 A1 | 10/2009 | Johansen |
| 2009/0252843 A1 | 10/2009 | Skinner |
| 2009/0269446 A1 | 10/2009 | Rabault et al. |
| 2009/0270337 A1 | 10/2009 | van Beckhoven et al. |
| 2009/0285946 A1 | 11/2009 | Kirihara et al. |
| 2009/0317516 A1 | 12/2009 | Newsteder |
| 2010/0003370 A1 | 1/2010 | De Baets |
| 2010/0009044 A1 | 1/2010 | Halden et al. |
| 2010/0021609 A1 | 1/2010 | Mattson et al. |
| 2010/0027412 A1 | 2/2010 | Yang et al. |
| 2010/0031677 A1 | 2/2010 | Lifson et al. |
| 2010/0034926 A1 | 2/2010 | Frick et al. |
| 2010/0034933 A1 | 2/2010 | Crawford et al. |
| 2010/0040736 A1 | 2/2010 | Van et al. |
| 2010/0092620 A1 | 4/2010 | Bravo et al. |
| 2010/0099864 A1 | 4/2010 | van der Maarel |
| 2010/0112174 A1 | 5/2010 | Christensen et al. |
| 2010/0137569 A1 | 6/2010 | Prakash et al. |
| 2010/0151105 A1 | 6/2010 | Kameo |
| 2010/0189843 A1 | 7/2010 | Xie et al. |
| 2010/0189875 A1 | 7/2010 | Finocchiaro |
| 2010/0215825 A1 | 8/2010 | Boursier et al. |
| 2010/0215826 A1 | 8/2010 | Campbell et al. |
| 2010/0233346 A1 | 9/2010 | Redl et al. |
| 2010/0255172 A1 | 10/2010 | Maningat et al. |
| 2010/0261671 A1 | 10/2010 | Frippiat et al. |
| 2010/0278981 A1 | 11/2010 | Ervin |
| 2010/0303956 A1 | 12/2010 | Hupfer et al. |
| 2010/0303962 A1 | 12/2010 | Penhasi et al. |
| 2010/0303987 A1 | 12/2010 | Watts et al. |
| 2010/0303991 A1 | 12/2010 | Karwowski et al. |
| 2010/0303996 A1 | 12/2010 | Lopez et al. |
| 2010/0303997 A1 | 12/2010 | Fulton |
| 2010/0310747 A1 | 12/2010 | Paulus et al. |
| 2010/0310748 A1 | 12/2010 | David et al. |
| 2010/0310749 A1 | 12/2010 | Cristadoro et al. |
| 2010/0316765 A1 | 12/2010 | French et al. |
| 2010/0316772 A1 | 12/2010 | Zubanas et al. |
| 2010/0316786 A1 | 12/2010 | Frohberg |
| 2010/0323088 A1 | 12/2010 | David et al. |
| 2010/0330256 A1 | 12/2010 | Lang et al. |
| 2011/0008491 A1 | 1/2011 | Mulder et al. |
| 2011/0008493 A1 | 1/2011 | Zorea |
| 2011/0021643 A1 | 1/2011 | Endo et al. |
| 2011/0027412 A1 | 2/2011 | Spence et al. |
| 2011/0038940 A1 | 2/2011 | Grizeau |
| 2011/0038984 A1 | 2/2011 | Afinsen et al. |
| 2011/0038995 A1 | 2/2011 | Thulin et al. |
| 2011/0039004 A1 | 2/2011 | Garter |
| 2011/0081446 A1 | 4/2011 | Aldred et al. |
| 2011/0081475 A1 | 4/2011 | Huber et al. |
| 2011/0117265 A1 | 5/2011 | Muller et al. |
| 2011/0039002 A1 | 6/2011 | Verkoeijen et al. |
| 2011/0143007 A1 | 6/2011 | Stengel |
| 2011/0159158 A1 | 6/2011 | Penna et al. |
| 2011/0166085 A1 | 7/2011 | Van et al. |
| 2011/0177223 A1 | 7/2011 | Mulder et al. |
| 2011/0195130 A1 | 8/2011 | Siegal |
| 2011/0206743 A1 | 8/2011 | Van Baalen et al. |
| 2011/0212916 A1 | 9/2011 | Bird et al. |
| 2011/0217411 A1 | 9/2011 | Van Der Beek et al. |
| 2011/0229602 A1 | 9/2011 | Aymard et al. |
| 2011/0250299 A1 | 10/2011 | Baseeth et al. |
| 2011/0256207 A1 | 10/2011 | Arndt et al. |
| 2011/0256261 A1 | 10/2011 | Jane et al. |
| 2011/0256278 A1 | 10/2011 | Hansa et al. |
| 2011/0268836 A1 | 11/2011 | Seneci |
| 2011/0274741 A1 | 11/2011 | Horton |

(56) References Cited

U.S. PATENT DOCUMENTS

| | | |
|---|---|---|
| 2011/0281818 A1 | 11/2011 | Jenkins et al. |
| 2011/0293809 A1 | 12/2011 | Petronio et al. |
| 2011/0296560 A1 | 12/2011 | Frohberg et al. |
| 2012/0035127 A1 | 2/2012 | Goffin et al. |
| 2012/0039956 A1 | 2/2012 | Harel et al. |
| 2012/0040070 A1 | 2/2012 | Mingus et al. |
| 2012/0052151 A1 | 3/2012 | Sannino et al. |
| 2012/0064015 A1 | 3/2012 | Valeri |
| 2012/0076910 A1 | 3/2012 | de Almeida et al. |
| 2012/0114770 A1 | 5/2012 | Regina et al. |
| 2012/0129805 A1 | 5/2012 | Li et al. |
| 2012/0138462 A1 | 6/2012 | Vann et al. |
| 2012/0141652 A1 | 6/2012 | Watanabe et al. |
| 2012/0156288 A1 | 6/2012 | Lakkis et al. |
| 2012/0183646 A1 | 7/2012 | de Laat |
| 2012/0196023 A1 | 8/2012 | Nagahata et al. |
| 2012/0258234 A1 | 10/2012 | Penna et al. |
| 2012/0283338 A1 | 11/2012 | Adkins et al. |
| 2012/0295003 A1 | 11/2012 | Daniel |
| 2012/0295007 A1 | 11/2012 | Singer |
| 2012/0322756 A1 | 12/2012 | Van Der Beek et al. |
| 2013/0040018 A1 | 2/2013 | Alexandre et al. |
| 2013/0040034 A1 | 2/2013 | Matsubara et al. |
| 2013/0052300 A1 | 2/2013 | Dendooven et al. |
| 2013/0064926 A1 | 3/2013 | Zapp Glauser |
| 2013/0071523 A1 | 3/2013 | Barrett et al. |
| 2013/0071524 A1 | 3/2013 | Barrett et al. |
| 2013/0089639 A1 | 4/2013 | Petre et al. |
| 2013/0115362 A1 | 5/2013 | Regina |
| 2003/0161816 A1 | 8/2013 | Vincent et al. |
| 2013/0202742 A1 | 8/2013 | Prakash et al. |
| 2013/0202763 A1 | 8/2013 | Prakash et al. |
| 2013/0202764 A1 | 8/2013 | Prakash et al. |
| 2013/0209646 A1 | 8/2013 | Kothapalli et al. |
| 2013/0236604 A1 | 9/2013 | De Baets |
| 2013/0243925 A1 | 9/2013 | van Lengerich et al. |
| 2013/0259978 A1 | 10/2013 | Bouvet et al. |
| 2013/0288606 A1 | 10/2013 | Kirsch |
| 2013/0316063 A1 | 11/2013 | Johnson et al. |
| 2013/0345139 A1 | 12/2013 | Oesser et al. |
| 2014/0023771 A1 | 1/2014 | Prakash et al. |
| 2014/0044826 A1 | 2/2014 | Regina et al. |
| 2014/0099404 A1 | 4/2014 | Dohl et al. |
| 2014/0167307 A1 | 6/2014 | Horton |
| 2014/0170260 A1 | 6/2014 | Van Der Beek et al. |
| 2014/0187480 A1 | 7/2014 | Van Der Beek et al. |
| 2014/0205709 A1 | 7/2014 | Li et al. |
| 2014/0205719 A1 | 7/2014 | Lanvin et al. |
| 2014/0220174 A1 | 8/2014 | Abrahamse et al. |
| 2014/0314932 A1 | 10/2014 | Ganjyal et al. |
| 2014/0322405 A1 | 10/2014 | Singer, Jr. |
| 2014/0356505 A1 | 12/2014 | Okoniewska et al. |
| 2015/0037469 A1 | 2/2015 | Folz et al. |

FOREIGN PATENT DOCUMENTS

| | | |
|---|---|---|
| CN | 1394116 | 1/2003 |
| CN | 1688199 | 10/2005 |
| CN | 1906216 | 1/2007 |
| CN | 101142932 | 3/2008 |
| CN | 100421576 | 10/2008 |
| CN | 101505614 | 8/2009 |
| CN | 101897353 | 12/2010 |
| EP | 0372596 | 6/1990 |
| EP | 0372596 A2 | 6/1990 |
| EP | 0691079 | 11/2001 |
| EP | 1553841 | 5/2006 |
| EP | 2720551 | 4/2015 |
| EP | 2720549 | 6/2015 |
| JP | S5129254 | 3/1976 |
| JP | S5129254 A | 3/1976 |
| JP | 06503228 | 4/1994 |
| JP | H06-153801 | 6/1994 |
| JP | 11-318337 | 11/1999 |
| JP | 2002507399 | 3/2002 |
| JP | 2004161992 | 6/2004 |
| JP | 2003-310165 | 11/2005 |
| JP | 2006527996 | 12/2006 |
| JP | 2009-060811 | 3/2009 |
| JP | 2010104236 | 5/2010 |
| JP | 55611741 | 7/2014 |
| WO | 1990015147 | 12/1990 |
| WO | 1994002023 | 2/1994 |
| WO | 1994022330 | 10/1994 |
| WO | 1996004799 | 2/1996 |
| WO | 9918804 A1 | 4/1999 |
| WO | 1999048372 | 9/1999 |
| WO | 03037105 | 5/2003 |
| WO | 2007095977 | 8/2007 |
| WO | 2008151062 | 12/2008 |
| WO | 2009056255 | 5/2009 |
| WO | 2009102845 | 8/2009 |
| WO | 2009158588 | 12/2009 |
| WO | 2010046492 | 4/2010 |
| WO | 2010046492 A1 | 4/2010 |
| WO | 20100046492 | 4/2010 |
| WO | WO 2010/059945 | 5/2010 |
| WO | 2010092023 | 8/2010 |
| WO | 2010092023 A2 | 8/2010 |
| WO | 2011006949 | 1/2011 |
| WO | 20110014468 | 2/2011 |
| WO | 2011084978 | 7/2011 |
| WO | 2012120154 | 9/2012 |
| WO | 2012120155 | 9/2012 |
| WO | 2012120156 | 9/2012 |
| WO | 2012155154 | 11/2012 |
| WO | 2013079084 | 6/2013 |
| WO | 2013126015 | 8/2013 |
| WO | 2013182564 | 12/2013 |
| WO | 2014046542 | 3/2014 |
| WO | 2014081807 | 5/2014 |
| WO | 2014083161 | 6/2014 |
| WO | 2014152037 | 9/2014 |

OTHER PUBLICATIONS

Grobelnik et al., "Rheological Properties of Dough Made From Grain Amaranth-Cereal Composite Flours Based on Wheat and Spelt", Czech J. Food Sci., vol. 27, 2009, No. 5, pp. 309-319.

Chevallier et al., "Physicochemical Behaviors of Sugars, Lipids, and Gluten in Short Dough and Biscuit", J. Agric Food Chem., 2000, 48(4), pp. 1322-1326.

Webpage: http://www.imchef.org/por-que-dejar-reposar-las-masas/.

Webpage: http://www.pequerecetas.com/recetas-de-postres-para-ninos/postres-de-ninos-glaseado/.

Miao Ming et al., "Study on a novel functional ingredient—slowly digestible starches with a low glycemic index", China Food Additive, No. 2, pp. 78-86.

Zheng Xiao, "Mechanical Analysis of Molding and Mold Releasing in Roller Printing Biscuit Machine", Journal of Wuhan Food Industry College, No. 2, pp. 36-39.

U. Lehmann, et al. "Slowly digestible starch—its structure and health implications: a review", Trends in Food Science and Technology, No. 18, pp. 346-355.

Peng Ya-jun, "Researches on Biscuit Shaping and Separating from Rotary Moulder Roller", Zhuhai Hong Fu Food Mechanical Co., Ltd., (2008).

International Preliminary Report on Patentability from corresponding International Patent Application No. PCT/EP2012/061891, dated Dec. 23, 2013, 5 pages.

Webpage: http://www.fao.org/inpho archive/content/documents/vlibrary/ae620s/pprocesados/CERE3.HTM.

Webpage: http://magrama.gob.es/es/alimentacion/temas/industria-agroalimentaria/guia marco pr%C3%A1cticas fabricaci%C3%B3n galletas tcm7-203291.pdf.

Reference to "Cookie Chemistry and Technology" by Karel Pulp, published by American Institute of Baking in 1994 (guide to the science, engineering and art of cookies technology sharing with reader ingredients of a cookie).

(56) References Cited

OTHER PUBLICATIONS

International Search Report and Written Opinion for International Application PCT/EP2012/061887, dated Jun. 20, 2012, 10 pages.
International Search Report and Written Opinion for International Application PCT/EP2012/061891, dated Jun. 20, 2012, 9 pages.
International Search Report and Written Opinion for International Application PCT/EP2012/061888, dated Jun. 20, 2012, 11 pages.
Technical Information citing "Biscuit, Cookie and Cracker Manufacturing Manuals" written by Duncan Manley, published by Elsevier Science Limited, 1998 (contains materials and ingredients for producing a cookie, choosing the materials for the production of the the cookie, et al., and packing materials).
Blaak, E.E. (1995). Health Aspects of Various Digestible Carbohydrates. Nutrition Research, 15(10), 1547-1573.
Englyst, K.N. (2003). Glycaemic index of cereal products explained by their content of rapidly and slowly available glucose. British Journal of Nutrition, vol. 89, 329-339.
Physical Dough Tests, American Association of Cereal Chemists AACC Method 54-21, Farinograph Method for Flour.
Nabim Wheat and Flour Testing, The National Association of British and Irish Millers, 2011.
Bjorck, I., et al. (1984). Effects of Processing on Starch Availability In Vitro and In Vivo. II. Drum-Drying of Wheat Flour. Journal of Cereal Science, vol. 2, 165-178.
Penson, S., Head of of Cereals and Milling Dept., Campden BRI, UK, "Wheat Quality Requirements", presentation Slides.
Frewin, Angela. "Biscuit Belvita breakfast bar from Kraft Foods." The Caterer, Mar. 24, 2010. Web. Jan. 27, 2016.
Aller, E.E.J.G., et al. (2011). Starches, Sugars and Obesity. Nutrients, vol. 3, 341-369.
Nabim Wheat Guide 2011, The National Association of British and Irish Millers.
Garsetti, M., et. al. (2005). The Glycemic and Insulinemic Index of Plain Sweet Biscuits: Relationships to in Vitro Strarch Digestability. Journal of the American College of Nutrition, 24(6), 441-447.
Sandel, Chris. "Product Review." 7 Health, Apr. 8, 2011. Web. Jan. 28, 2016.
Scientific Opinion from the European Food Safety Authority (EFSA) published Jul. 21, 2011.
Wheat: Chemistry and Technology, vol. II, Edited by Y. Pomeraz, American Assoc. of Cereal Chemists, Inc.
Our homemade ANZAC biscuit, cookpad, Recipe ID: 343189, Aug. 11, 2009.
Shigehisa Shibata and Toshiaki Nakae, 4.1 Type of flour, Knowledge of Wheat Flour Products, Revised and updated version, second printing, pp. 67-72, Saiwai Shobo, 2000.
Kazufumi Yamaki, et al., Utilization of Hokkaido-grown Wheat in Sponge Cake, Hokkaido Research Organization, Food Processing Research Center Report, No. 2, pp. 5-10, 1996.
ISO (2013). ISO 5530 Wheat Flour—Physical characteristics of doughs.
Sobako biscuit (buckwheat biscuit), Cookpad (Mar. 3, 2003).
Sobako cookie (buckwheat cookie), Cookpad (Feb. 23, 2009).
Sobako no cookie (cookie of buckwheat), Cookpad (Jul. 7, 2009).
Vujic, Lovorka, "Impact of Dietetic Tea Biscuit Formulation on Starch Digestibility and Selected Nutritional and Sensory Characteristics" LWT—Food Sci. and Tech. (2014).
"Nutritional and functional added value of oat, Kamut, spelt, rye and buckwheat versus common wheat in breadmaking", Alessandro Angioloni and Concha Collar; JSci Agric. 2011:91: 1283-1292, 10 pages.
"Studies on functional properties and incorporation of buckwheat flour for biscuit making", Baljeet, S.Y. Ritika, B.Y. and Roshan, L.Y. International Food Research Journal 17: 1067-1076 (2010), 9 pages.
Chinese Office Action, Notice of Reexamination, Invention No. 201280030321.5, dated Nov. 28, 2016, 11 pages.
Columbian Office Action No. 2 3681, Application No. 14009912, dated Jun. 21, 2016,13 pages.
Columbian Office Action No. 6255, Application No. 16-081.252, dated Jun. 21, 2016, 3 pages.
European Patent Application No. 14851006.8, Communication Pursuant to Rules 161(2) and 162 EPC, dated May 12, 2016, 2 pages.
Notification of Transmittal of the International Search Report and the Written Opinion of the International Searching Authority, or the Declaration, Application No. PCT/US2014/05012, dated Dec. 12, 2014, 8 pages.
Japanese Office Action, Official Notice of Final Decision of Rejection, patent application No. 2014-516329, dated Feb. 9, 2016, 12 pages.
Japanese Office Action, Notice of Reasons for Refusal, patent application No. 2016-516872, dated Dec. 15, 2016, 12 pages.
"Kraft Breakfast Cereal Biscuits: Nutritional and Metabolic Assets", Kraft Biscuits Europe Research and Development Brochure for Professionals, 15 pages.
Report "Utilization of Hokkaido-grown Wheat in Sponge Cake", Yamaki, et al., Hokkaido Food Publication No. 2 1996, 6 pages.
Russian Office Action, Application No. 2016109945, dated Jul. 2, 2017, 10 pages.
Article "Nutritional Properties of Starch in Buckwheat Products: Studies in Virtro and in Vivo", Skrabanja et al., J. Agric. Food Chem. 2001, 49, 490-496, 7 pages.
Corradini, MG et al., "Squeezing flow of semi liquid foods between parallel Teflon coated plates" Rheologica Acta May 2000, vol. 39, Issue 5, abstract, p. 454.
Englyst, et al. "Rapidly available glucose in foods: an in vitro measurement that reflects the glycemic response" Am. J. Clin. Nutr. (1999) 69, 448-454.
Archana Rathi et al, "Influence of depigmentation of pearl millet (*Pennisetum gluacum* L.) on sensory attributes, nutrient composition and in vitro digestibility of biscuits" LWT—Food Science and Technology, vol. 37, issue 2, Mar. 2004, pp. 187-192.
http:www.fao.org/inpho_archive/content/documetns/vlibrary/we620s/pprocesados/CERE3.htm.
ISO Wheat Flour—Physical characteristics of doughs.
Japanese Patent Application No. 2014516328 dated Jul. 7, 2015, 12 pages.
Acquistucci et al., "Italian Buckwheat (*Fagopyrum esculentum* ) Starch: Physiochemical and Functional Characterization and in vitro digestibility" Nahrung, 1997, 41, pp. 281-284.
International Patent Application No. PCT/US2014/0268535; International Preliminary Report on Patentability dated Sep. 15, 2015, 8 pages.
International Patent Application No. PCT/US2014/0268535; International Search Report dated Jul. 24, 2014, 2 pages.
International Patent Application No. PCT/US2014/0268535; Written Opinion dated Jul. 24, 2014, 7 pages.

\* cited by examiner to oven

BISCUIT DOUGH

CROSS-REFERENCE TO RELATED APPLICATIONS

The present application is a U.S. National Stage Entry of International Patent Application No. PCT/EP2012/061891, filed 20 Jun. 2012, which in turn claims priority benefit from U.S. Provisional Patent Application No. 61/498,986, filed 20 Jun. 2011, and European Patent Application Nos.: 11290279.6, filed 20 Jun. 2011, and 11290278.8, filed 20 Jun. 2011, all of which are hereby incorporated by reference in their entireties.

The present invention concerns biscuits, including layered and filled cookies. More specifically, the present disclosure concerns the dough suitable for the production of such biscuits and a method for producing biscuits from the dough.

Biscuits are conventionally made from refined flours. With an increasing consumer awareness of the relative health merits of different foods, food products made from wholegrain flours are in increasing demand. This is because the nutritional pattern of wholegrain flours is considered healthier by consumers than that of refined flours. There is also a desire for food products that deliver long-lasting energy and meet a number of health criteria.

Biscuits that provide a slow release of carbohydrates and therefore have a long-lasting energy release, are believed to be beneficial for consumers' health. The starch fraction that is slowly digested (slowly digestible starch or SDS) is responsible for this long-lasting energy release. Products like biscuits comprise a significant amount of slowly digestible starch before baking. This amount of slowly digestible starch decreases during the baking process. This is due to the gelatinisation of the SDS during the baking process. The gelatinisation occurs owing to the presence of water in the dough mixture. Gelatinisation refers to the partial melting of the crystalline domains of starch, resulting in increased digestibility. During the heat treatment of moist dough the starch granules first swell, then progressively loose their crystalline structure until they burst, resulting in the leaching out of the polysaccharides contained in the granules (amylose and amylopectin). In highly concentrated systems such as biscuit doughs, this sequence of event may be limited by the restricted moisture content, but the progressive melting of the crystalline domains still occurs.

It will be understood in the following that "long-lasting energy" would imply that the amount of slowly digestible starch, measured by slowly available glucose (SAG) of the final product using Englyst method (Englyst, 1996), is above 15.0 g/100 g in the final product.

One solution for increasing the slowly digestible starch content is to form a sandwich biscuit and to add native starch to the filling composition. However, the amount of native starch that can be added is limited by the organoleptic properties of the product. Indeed, if the content of native starch is too high it will give a disagreeable mouth feel.

Another solution would be to increase the starch content, the source of SAG, in the dough composition of the biscuit, but this significantly decreases the process-ability of the dough and requires an increase in the required water addition. The negative effect on SAG of increasing the added water (which increases gelatinisation of the starch) outweighs the positive effect of adding more starch.

Another issue with biscuits is the content of fat and/or sugar required. Fat and sugar are dough plasticizers. Consequently, it is desirable to include such ingredients in the dough to improve the process-ability of the dough. However, the addition of these ingredients has an adverse effect on the nutritional value of the biscuit.

Another solution would be to include polyols or short-chain soluble fibres, such as fructooligosaccharides, polydextrose, resistant dextrins and the like in the dough. Polyols and short-chain soluble fibres mimic sugar behaviour during processing hence improve the process-ability of the dough. However, these ingredients can raise gastrointestinal tolerance issues.

For handling the poor process-ability of the dough, water can of course be added to the dough. However, water triggers gelatinisation of starch during the baking of the biscuit and this results in an undesirably low slowly digestible starch content in the baked biscuit part. Therefore, the long-lasting energy property can be lost.

In US 2007/134,392 a dough is made from 70 wt % wheat flour, 7 wt % butter, 5 wt % fructose with 28% water content. Using this formulation, US 2007/134,392 attempts to obtain a biscuit with a high slowly-digestible-starch content and that can be considered healthy. A starch product is used in the dough that has been at least partially gelatinised or at least partially plasticised with a short-chain amylose, resulting in a crystalline structure of the starch product that is slowly digested by the amylase. However, the biscuit of US 2007/134392 fails to fulfil the long-lasting energy criteria.

The use of flakes can improve the SDS content. The starch coming from the flakes has less contact with any added water in the dough, and thus gelatinises to a lesser extent than, for example, the starch in a finely ground flour. Consequently, flake starch is a good candidate for helping maintain a high value of slowly available starch. Flakes also require less hydration than flours. However, using too many flakes is not ideal for biscuits since consumers do not expect to see a high flake content in a biscuit. The texture of these biscuits with too many flakes is overly chewy and parts of the biscuit remain stuck to the teeth. In particular, these biscuits can be denser and have a flaky/sandy texture.

Consequently, there is a need for a dough and a method for using the dough to provide an improved biscuit, tackle at least some of the problems associated with the prior art, or at least provide a commercially useful alternative thereto.

Accordingly, in a first aspect the present disclosure provides a dough for producing a biscuit having a slowly-digestible-starch-over-total-available-starch ratio of at least 31%, the biscuit comprising at least 29 wt % cereal flour, 5 to 22 wt % fat and at most 30 wt % sugar relative to the total weight of the biscuit, the dough comprising:

cereal flour, fat, sugar and added water;

and wherein the added water is in an amount of at most 8 wt % relative to the weight of dough.

The present disclosure will now be further described. In the following passages different aspects of the disclosure are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Doughs are commonly used to make breads and other bakery products. A dough is a mixture made by mixing flour and other ingredients with an amount of water. In a bread dough, for example, the weight of added water is about 40% of the weight of the total dough weight. The dough of the present disclosure preferably has a low water content and a low cohesion. That is, the dough preferably does not stretch and instead falls apart under an applied force. The dough may, indeed, be considered as crumbly.

Biscuits are baked, edible, cereal-based products. They typically have a low moisture and a crispy texture. They are typically small, and leavened with baking powder, baking soda, or sometimes yeast. They are typically sweet. They can contain inclusions and fillings.

The dough disclosed herein is for producing a biscuit having a slowly-digestible-starch-over-total-available-starch ratio of at least 31%, preferably at least 35 wt %, more preferably at least 38 wt %, still more preferably at least 40 wt %. The highest ratio will preferably be at most 80 wt % for digestibility. Total available starch comprises slowly digestible starch (SDS) and rapidly digestible starch (RDS). The difference between total available starch and total starch is that total available starch does not comprise resistant starch that cannot be digested, i.e. that escapes digestion in the small intestine.

It is believed that slowly digestible starch gives a higher health benefit than rapidly digestible starch. Indeed, rapidly digestible starch is rapidly broken down into glucose during digestion and thus rapidly made available to the body. Therefore, the blood glucose level rapidly increases. This can trigger insulin delivery leading to some storage in adipose tissues. Consequently, energy can only be provided for a shorter time. On the contrary, slowly digestible starch is slowly assimilated by the body. Consequently, energy can be provided for a longer time.

SDS or slowly available glucose (SAG) can be characterised through the slowly available glucose (SAG) measurement by Englyst method ("Rapidly Available Glucose in Foods: an In Vitro Measurement that Reflects the Glycaemic Response", Englyst et al., Am. J. Clin. Nutr., 1996 (3), 69(3), 448-454; "Glycaemic Index of Cereal Products Explained by Their Content of Rapidly and Slowly Available Glucose", Englyst et al., Br. J. Nutr., 2003(3), 89(3), 329-340; "Measurement of Rapidly Available Glucose (RAG) in Plant Foods: a Potential In Vitro Predictor of the Glycaemic Response", Englyst et al., Br. J. Nutr., 1996(3), 75(3), 327-337). SAG refers to the amount of glucose (from sugar and starch, including maltodextrins) likely to be available for slow absorption in the human small intestine. In the present case of the disclosure, the SDS content equals the SAG content since there is no other SAG source than starch, i.e. SDS. Rapidly available glucose (RAG) refers to the amount of glucose likely to be available for rapid absorption in the human small intestine.

In Englyst method, biscuit samples are prepared by manually and roughly grinding one or more biscuits. The biscuit samples are then subjected to an enzymatic digestion by incubation in presence of invertase, pancreatic alpha-amylase and amyloglucosidase under standardised conditions. Parameters such as pH, temperature (37° C.), viscosity and mechanical mixing are adjusted to mimic the gastrointestinal conditions. After an enzymatic digestion time of 20 min, glucose is measured and is labelled RAG. After an enzymatic digestion time of 120 min, glucose is again measured and is labelled available glucose (AG). SAG is obtained by subtracting RAG to AG (SAG=AG−RAG), thus, SAG corresponds to the glucose fraction released between the $20^{th}$ and the $120^{th}$ minute. Free glucose (FG), including the glucose released from sucrose, is obtained by separate analysis. RDS is then obtained as the subtraction of FG from RAG (RDS=RAG−FG).

Preferably, a ready-to-eat biscuit or sandwich cookie has at least 15 g SAG/100 g. Preferably, the ready-to-eat biscuit or sandwich cookie has a SAG content of at least 16.5 g/100 g, more preferably at least 18.0 g/100 g, still more preferably at least 21.0 g/100 g. The highest SAG will preferably be at most 50.0 g/100 g.

The dough comprises cereal flour, fat, sugars and added water. The dough may also comprise further ingredients, such as flakes, and these further ingredients are discussed in detail below.

The dough is used to form a biscuit comprising at least 29 wt % cereal flour, 5 to 22 wt % fat and at most 30 wt % sugar relative to the total weight of the biscuit. The dough used to form such a biscuit will generally contain a lower wt % of these components due to the presence in the dough of water which is removed in the final biscuit by the baking step. Thus, the dough used to form the biscuit will generally have at least about 29 wt % cereal flour, about 4 to about 20 wt % fat and at most about 27 wt % sugar.

The dough comprises added water in an amount of at most 8 wt % relative to the total weight of the dough. That is, the added water forms 8 wt % of the total dough before baking. This water is substantially removed from the biscuit during baking. Added water does not include the water that is already present in some of the ingredients (such as the about 14 wt % of cereal flour that is water). At least some of the water present in these ingredients is also removed from the biscuit during baking. Hence, the wt % of cereal flour in the dough and in the final biscuit is substantially the same, due to this loss of moisture. Components without a moisture content (such as fat) will then form a larger wt % of the biscuit than of the dough.

The dough comprises at most 8 wt % added water, preferably from 3 to 8 wt %, and more preferably from 4 to 7 wt % and most preferably from 5 to 6 wt %. As noted above, the term "added water" means water that is added in addition to the other ingredients. Thus, "added water" does not include water contained in any other ingredients such as cereal flour (typically around 10-15 wt %), flakes or bran and germs. For syrups of sugars, short chain soluble fibres, polyols and the like, the water present in the syrup is considered as part of the added water, The rheology of a biscuit dough as discussed herein and having a water content of from 3 to 8 wt % is quite characteristic. The dough typically does not have a "continuous" structure like a bread/pizza dough, and is instead more like a collection of disconnected particles. When the dough has a water content of less than 3 wt % no dough can be formed. At such low hydration levels the dough behaves more like a granular material (similar to sand). The dough texture resembles that of shortbread or crumble dough and exhibits a very limited cohesion. Such doughs are also much harder upon compression than more hydrated doughs. Thus, the dough workability is diminished and it cannot be processed by rotary moulding. With higher amounts of added water than 8 wt %, the dough machinability increases but the extent of starch hydrolysis on baking is increased and the SDS decreases.

The dough (and, hence, the final biscuit) comprises cereal flour. The cereal flour is present in the biscuit in an amount of at least 29 wt %, more preferably at least 30 wt %, more preferably at least 31 wt %. Preferably, the biscuit comprises at most 70 wt % cereal flour, more preferably at most 60 wt %, still more preferably at most 50 wt %.

The cereal flour may comprise refined cereal flour and/or wholegrain cereal flour.

The cereal flour preferably comprises refined cereal flour. The refined cereal flour is preferably selected from soft wheat flour, wheat flour with low damaged starch, and thermally treated wheat flour and mixtures thereof. Using these kinds of flour it is possible to limit the starch gelatinisation during baking and increase the SDS in the final product. Indeed, in these flours, starch is less damaged than conventional refined wheat flour. As said before, starch gelatinisation enables starch to be more easily digestible and thus reduces slowly-digestible-starch content in the final product.

Soft wheat flours and hard wheat flours are both wheat flour types produced from *Triticum aestivum*. Soft wheat flours should not be confused with flours produced from *Triticum aestivum* only and hard wheat flours with flours produced from *Triticum durum*. Terms "soft" and "hard" refer to the hardness of the grains of *Triticum aestivum* used to make the flour and not to the species of wheat. Hardness of the grains is due to density of endosperm cells. Soft wheat endosperm has a lower density, which corresponds to weaker starch and protein bonds. Consequently soft wheat grains can be crushed into finer particles than hard wheat grains and resulting in less damaged starch.

Soft wheat flours may be obtained from the milling of soft wheat, for example those commercialised under the name Crousty, Alteo, Epson (both from Syngenta) or Arkeos (from Limagrain), etc. The use of softer flours, which absorb less water, allows for the use of a wider range of added water than for harder flours. That is, even if up to 10 wt % water is used, the flour generally absorbs less of the water and the starch content is consequently less gelatinised during baking. Moreover, since less water is absorbed, there is more free water available to lubricate the dough and a processable dough can be produced even with a reduced amount of added water (around 3-4 wt %). In one embodiment, when using a soft flour, the dough may comprise up to 10 wt % added water.

Wheat flour with low damaged starch means a flour with a content of damaged starch lower than 5.5% of the flour weight. Damaged starch content is the percentage of starch granules that are physically damaged during the milling operation. It is measured by AACC 76-31.01 method Examples of thermally treated wheat flours are wheat flours treated with a number of heating and cooling cycles or annealed. Annealing is a hydrothermal treatment that changes the physicochemical properties of starches by improving crystal growth and by facilitating interactions between starch chains.

The refined wheat flour is preferably made of specifically selected milling fractions so that the flour has a very low water absorption under 55% as measured by Brabender® Farinograph® according to NF-ISO-5530-1 norm. Preferably, the selected milling fractions have a small particle size, i.e. the percentage of fine particles under 40 μm is above 50%. Selecting milling fractions can be assisted by granulometry analysis (by laser granulometry or mesh diameter) during milling. The use of these tests is well known in the art of baking and described below.

The cereal flour preferably comprises refined cereal flour, preferably refined wheat flour. The refined cereal flour preferably represents at least 14.5 wt % of the dough and of the biscuit, with a water absorption under 55% as measured by Brabender® Farinograph® according to NF-ISO-5530-1 norm, preferably under 52%. More preferably at least 21 wt %, preferably at least 41 wt %, of the dough and biscuit are such a refined cereal flour. Use of this type of flour gives the advantage that less water is needed to form the dough and thus limits gelatinisation of starch. Preferably, the refined cereal flour represents at most 60 wt %, preferably at most 50 wt % of the dough. As a consequence, a healthier cookie is obtained.

The measure by Brabender® Farinograph® is normalised under NF-ISO-5530-1. Water absorption is defined in this norm as the quantity of water per 100 g of flour at 14 wt % water content needed to have a dough with a maximal consistency of 500 UF. Consistency is the resistance, expressed in arbitrary units (farinographic units UF), of a dough during kneading inside the Farinograph®, at a constant speed specified in the norm. First, water content of the flour is measured. Then, water is added to the flour, quantity of water being calculated so that consistency of the dough is close to 500 UF (480 UF to 520 UF). Flour and water are kneaded together and measures are recorded for two dough troughs. From these measures and the volume of water added to the flour to form the dough, water absorption is obtained.

Techniques for measuring water content are well known in the art. The water content of the flour, dough and final biscuits can be measured using the AAC 44-15.02 International Method (Moisture-air oven methods), revised 1999.

The cereal flour can preferably comprise a wholegrain cereal flour. Use of wholegrain flours makes it more difficult to form processable dough. This is because the wholegrain flours, unlike refined flours, comprise bran and germ in addition to endosperm. Bran and germ contain higher amount of fibers than the endosperm and therefore have a higher water retention capacity. If the same level of dough hydration is kept, the dough has a more granular consistency and a harder, drier texture, what makes it less easy to process. However, the inclusion of wholegrain cereal flour is associated with a number of health benefits.

"Wholegrain cereal flour(s)" means flour produced directly or indirectly from cereal whole grains comprising endosperm, bran and germ. The wholegrain flour can also be preferably reconstituted from separate flours made from endosperm, bran and germ respectively in ratios that give the reconstituted wholegrain flour the same composition as wholegrain flour directly produced from grains that still retain bran and germ.

"Wholegrain cereal flour" should be distinguished from "refined cereal flour" that means flour made from cereal endosperm only. The cereal flour in the dough preferably comprises wholegrain cereal flour. The biscuit preferably comprises at least 29 wt % wholegrain cereal flour, preferably at least 30 wt %, more preferably at least 31 wt %. Preferably, the biscuit comprises at most 70 wt % wholegrain cereal flour, more preferably at most 60 wt %, still more preferably at most 50 wt %. When amount of wholegrain cereal flour is over 70 wt %, it becomes very difficult to process the dough.

The wholegrain cereal flour is preferably selected from wholegrain wheat flour, wholegrain barley flour, wholegrain rye flour, wholegrain spelt flour, wholegrain oat flour, wholegrain rice flour, wholegrain maize flour, wholegrain millet flour, wholegrain sorghum flour, wholegrain teff flour, wholegrain triticale flour, and pseudocereal flour such as amaranth flour and quinoa flour, and mixtures of two or more thereof. Preferably, the wholegrain cereal flour is selected from wholegrain wheat flour, wholegrain barley flour, wholegrain rye flour, wholegrain spelt flour, wholegrain oat flour and mixtures or two or more thereof. More preferably, it is selected from wholegrain wheat flour, wholegrain barley flour, wholegrain rye flour, wholegrain spelt flour and mixtures of two or more thereof.

Preferably, the wholegrain cereal flour comprises at least two different types of wholegrain cereal flours.

In one embodiment, the wholegrain cereal flour comprises wholegrain wheat flour. The wholegrain wheat flour can be a reconstituted wholegrain wheat flour obtained from a mixture of refined wheat flour, wheat bran flour and wheat germ flour. Preferably, the refined wheat flour is the same as the refined wheat flour with a water absorption under 55% as measured by Brabender® Farinograph® which can be used in this method. In this latter case, a part of this refined wheat flour is used to reconstitute the wholegrain wheat flour, however this part will be included in the refined wheat flour content of the dough and, at the same time, part of the wholegrain cereal flour content. Consequently, it will be included in the at least 14.5 wt % of the biscuit of refined wheat flour, preferably at least 29 wt %. Preferably, the other wholegrain cereal flour(s) are chosen amongst wholegrain barley flour, wholegrain rye flour, wholegrain spelt flour and mixture thereof.

In one preferred embodiment, the wholegrain cereal flour comprises at most 80 wt % wholegrain wheat flour, preferably at most 60 wt %, more preferably at most 50 wt % and still more preferably at most 32 wt %, relative to the wholegrain cereal flour content.

In a still preferred embodiment, the wholegrain cereal flour comprises four different types of wholegrain cereal flour: wholegrain barley flour, wholegrain rye flour, wholegrain spelt flour and wholegrain wheat flour.

Preferably, the wholegrain cereal flour is a multicereal flour, i.e. at least 20 wt % of the wholegrain cereal flour is not wholegrain wheat flour, preferably at least 40 wt %, more preferably at least 50 wt % and still more preferably at least 68 wt %.

When types of wholegrain cereal flour other than wholegrain wheat flour are used it is even more difficult to obtain a biscuit with the adequate SDS/(SDS+RDS) value over 31 wt % since some types of wholegrain cereal flour, such as rye, barley and spelt contain less SDS than wholegrain wheat flour.

The dough and the biscuit comprise fat. As defined herein "fat" or "fats" means any lipid source, vegetable or animal source that is edible and can be used to make the layered cookie. Examples of such fat are palm oil, rapeseed oil, and other vegetable oils, and other vegetable oils, butter from animal source.

The fat is present in an amount of from 5 to 22 wt % by weight of the biscuit.

Preferably, a ready-to-eat layered cookie obtainable with the dough disclosed herein has 10 wt % to 25 wt % fat, more preferably 11 wt % to 23 wt % fat, even more preferably 12 wt % to 20 wt %, still even more preferably 15 wt % to 20 wt %. A biscuit or the biscuit part of the layered cookie preferably contains 5 wt % to 22 wt % fat over the total weight of the biscuit part, preferably 6 wt % to 20 wt %, more preferably 7 wt % to 15 wt %.

The biscuit comprises at most 30 wt % sugar. As defined herein, "sugar" or "sugars" means the dry matter of any mono- and disaccharides, whatever the source and also by extension all the dry matter of the glucose syrup, also called glucose-fructose syrup or fructose-glucose syrup. Among monosaccharides there are fructose, galactose, glucose, mannose and mixtures thereof. Among disaccharides, there is saccharose, but saccharose may be partly or totally replaced with another disaccharide, such as lactose or maltose. Glucose syrup contains mono and disaccharides, but also some longer chains of polymerized dextrose. For the avoidance of doubt, when considering the amount of sugar added to a mixture in the form of a glucose syrup or other sugar suspension, only the dry weight of sugar should be considered. The water content of the syrup or suspension should be considered as part of the added water as described herein.

The most preferred amount of sugar present in the biscuit recipe (i.e. excluding filling) is at least 12 wt %. This is for both sensory impact and technical reasons. Without wishing to be bound by theory, it is speculated that below 12 wt % sugars the machinability of the dough is affected. In general in the dough a continuous phase is formed by the added water enriched by the soluble ingredients that are able to dissolve. Because the sugar is able to dissolve in the water it effectively increases the effective volume of the water present (1 g of sugar dissolved in 1 ml of water gives a total volume of 1.6 ml). Hence, the presence of at least 12 wt % sugars decreases the requirement to include further added water and, hence, by allowing for less water, increases the SDS value of the final biscuit.

The biscuit may also comprise polyols or short-chain soluble fibres. These act in a similar way to sugars in improving the machinability of the dough without increasing the hydrolysis of the starch present in the biscuits. The use of polyols or short-chain soluble fibres allow for the provision of a sugar-free or reduced sugar biscuit. Preferably, the ingredients comprise less than 20%, preferably less than 10 wt %, preferably less than 5% of polyols or short-chain soluble fibres for gastrointestinal tolerance issues and for clean labelling. Similarly as for sugars, only the dry weight of polyols or short-chain soluble fibres should be considered. If a biscuit comprises more than 10 wt % polyols then it is considered to have laxative properties and must be labelled accordingly. Most preferably, the ingredients do not comprise polyols or short-chain soluble fibres. In one embodiment, the biscuits comprise at least 0.1 wt % polyols or short-chain soluble fibres. In one embodiment, the ingredients do not comprise guar gum or other viscous soluble fibers such as pectins, xanthan gum, psyllium, or glucomannan.

Preferably, a ready-to-eat layered cookie obtainable with the dough disclosed herein (including filling) comprises 15 wt % to 40 wt % sugar, preferably 18 wt % to 36 wt %, more preferably 20 wt % to 32 wt %, still more preferably 25 wt % to 30 wt %, over the total weight of the layered cookie. The biscuit part (or the biscuit for an unfilled or non-layered biscuit) preferably contains 10 wt % to 25 wt % sugar over the total weight of the biscuit part, preferably 11 wt % to 22 wt %, more preferably 12 wt % to 20 wt %, even more preferably 12 wt % to 15 wt %.

The biscuit may further comprise from about 19 to about 50 wt % of further ingredients, including wholegrain cereal flakes, non-refined, non-wholegrain flour and additional ingredients, such as, emulsifiers, leavening agents, vitamins, minerals, salt, flavourings and milk or dairy ingredients, and combinations thereof. These additional ingredients are discussed in more detail below.

The biscuit may further comprise at most 34.5 wt % wholegrain cereal flakes, preferably at most 19 wt %, preferably at most 16 wt %, more preferably at most 11 wt %, still more preferably at most 9 wt %, for example wholegrain oat flakes or malted wholegrain rye flakes. An excess of flakes, i.e. over 19 wt %, will give the biscuit an unexpected appearance, i.e. the appearance of a granola biscuit and a denser product that can discourage potential consumers. When flakes are present, preferably they comprise at least about 0.9 wt % of the biscuit, since lesser amounts may not be discernable in the final product.

More generally, the biscuit part of the ready-to-eat layered cookie may comprise visible pieces of cereal whole grains.

The preferred flakes are oat flakes and malted rye flakes due to the sensory impact on consumers. This also helps to increase the wholegrain content of the dough recipe without compromising on the palatability of the final biscuits. The most preferred flakes are baby oat flakes since their appearance is advantageous for the consumer and they contribute additional SDS to the biscuit that is less readily hydrolysed during baking. They remain more intact than large flakes during processing.

By way of example, some ranges of the content of different flakes are set out in the table below:

| Ingredient type | Minimum % in biscuit formula | Maximum % in biscuit formula |
| --- | --- | --- |
| Wheat flakes | 0.9 | 9 |
| Malted rye flakes | 0.9 | 19 |
| Baby oat flakes | 3 | 18 |
| Oat flakes | 3 | 9 |
| Barley flakes | 0.9 | 3 |

The biscuit part of the ready-to-eat layered cookie can still comprise additional cereal bran and/or cereal germ. In case there are additional cereal bran and cereal germ, the bran and the germ come from different cereals chosen amongst: wheat, barley, rye, spelt, oat or a mixture thereof.

The dough and the biscuit may include other ingredients. Other ingredients that can be mixed with the cereal flour and water for forming the dough are: emulsifier, leavening agents. Emulsifier can be soybean lecithin, diacetyl tartaric ester of monoglyceride, sodium stearoyl lactylate. Leavening agent can be ammonium bicarbonate, sodium bicarbonate, sodium pyrophosphate acid or a mixture thereof. Other ingredients can also be vitamins or minerals such as vitamin B1, vitamin, vitamin PP, iron and magnesium and a mixture thereof.

Still other dry ingredients can be salt, flavouring agents, cocoa powder, solid pieces, milk and dairy derivatives, honey and calcium supplementation.

Flavouring agent can be in powder form or liquid form.

Solid pieces may be chocolate drops, fruit pieces, nuts like hazelnut (preferably hazelnut pieces), extruded cereal, etc. Solid pieces do not include cereal flakes. Solid pieces bring texture and flavour without increasing SAG content. The biscuit preferably comprises 2 wt % to 15 wt % solid pieces, preferably 4 wt % to 10 wt %.

Chocolate drops are pieces of solid chocolate. "Chocolate" is understood as meaning either "dark chocolate", "milk chocolate" or "white chocolate". Preferably, chocolate drops are dark chocolate pieces containing at least 35 wt % of cocoa liquor (US legislation), more preferably 35 wt % of cocoa solids (European Union legislation), still more preferably at least 40 wt %.

Within the scope of the disclosure, "fruit pieces" means pieces of any sweet, edible part of a plant that resembles fruit, for example raisin, fig, prune, orange, cranberry, blueberry, raspberry, strawberry, apricot, blackcurrant, redcurrant, peach, pear, kiwi, banana, apple, lemon, pineapple, tomato. These pieces of fruit are either dried or processed. This wording does not include nuts.

Preferably the dough has a prebaking density of from 1.0 to 1.5 g/cm$^3$, preferably from 1.1 to 1.4 g/cm$^3$ and more preferably from 1.2 to 1.3 g/cm$^3$. That is, the combination of ingredients is such that when pressed into the form of a desired pre-baking biscuit shape, the dough should have a density of from 1.0 to 1.5 g/cm$^3$. This density provides cohesion to the dough that leads to a final product with a desirable texture and strength. When the density of the dough is lower, the texture of the biscuit is softer and the biscuit is less able to form a cohesive structure and is more prone to damage in transit. When the density of the dough is higher, such as from 1.3 to 1.5 g/cm$^3$, it is possible to employ less fat in the dough and still obtain a coherent biscuit. However, as the density of the biscuit increases, it may be overly hard and less desirable to the consumer. The dough density before moulding is typically about 0.7 g/cm$^3$.

The compression can be quantified by calculating the density, i.e. the mass per unit volume, of the dough in the rotary mould. This is done by dividing the weight of a dough piece (straight after rotary moulding) by the volume of the rotary mould. The density of dough after compression in the rotary mould is preferably between 1.2 and 1.3 g/cm$^3$.

The dough preferably has a particle size distribution such that at least 20%, preferably 30%, preferably 50%, more preferably 70 wt % of the dough passes through a vibrating sieve mesh of 10 mm. The dough preferably has a particle size distribution such that at least 8 wt %, preferably at least 10 wt % and more preferably at least 15 wt % of the dough passes through a vibrating sieve mesh of 2 mm. The particle size distribution can preferably be determined using five graded sieves having meshes of 10, 8, 6.3, 4 and 2 mm, wherein the sieves are vibrated with a sieve acceleration of 1.5 mm/"g" for a duration of 3 minutes. A suitable machine for performing the sieving is a Vibratory Sieve Shaker AS 200 Control (RETSCH, Germany) and the various test parameters and units are well known in the art. A sample size for performing the analysis is preferably 800 g. The value "g" is the standard gravity constant (g=9.81 m·s$^{-2}$).

It is also preferred that the dough has a particle size distribution such that the D10 of the dough mass distribution is at most 6 mm, preferably at most 3 mm. This is measured by calculating the cumulated particle size distribution against the mesh size and taking the mesh size value that corresponds to 90% of the dough distribution.

Preferably the dough requires a pressure of at least 5000 kg/m$^2$ to be compressed to a density of 1.22 g/cm$^3$. More preferably the pressure required to compress the dough to a density of 1.22 g/cm$^3$ is from 6500 to 30000 kg/m$^2$, more preferably from 7500 to 15000 kg/m$^2$. The pressure required to compress the dough is preferably measured using a cylindrical pot having a diameter of 5.2 cm, wherein 100 g of dough is introduced into the pot and the dough is compressed into the pot by a circular plate having a diameter of 5 cm and connected to a force-meter, and wherein the circular plate advances at a rate of 0.7 mm/s, wherein the force required to achieve a calculated density of 1.22 g/cm$^3$ is recorded. The force is then converted into a pressure value by dividing by the surface of the plate.

The dough may be used to provide a layered cookie. Within the scope of the disclosure, "layered cookie" will be understood as a cookie made of alternating and successive layers of biscuits and filling. The simplest layered cookie is a cookie 4 with a single base biscuit 41 on top of which a filling 43 is deposited as illustrated in FIG. 4. Another type of layered cookie is sandwich cookie 5 which comprises a layer of filling 53 between two layers of biscuits 51, 52 as illustrated in FIG. 5.

For a filled or layered biscuit there will be a filling part. The filling part is a filling having a consistency that ranges, after cooling, from viscous (for a jam) to a solid (for an anhydrous fat filling). The filling can be water based or fat based.

Preferably, at 40° C., the filling has a Casson viscosity between 0.5 Pa·s and 500 Pa·s and a yield stress between 0.1

Pa and 1000 Pa. The Casson yield stress and viscosity can be measured according to the IOCCC 10/1973:2000 method. This relies on the use of a high performance rheometer MCR300 (Anton Paar Physica) interfaced with a PC and equipped with a coaxial measuring unit (TEZ 150-PC) and a coaxial cylinder measurement system (CC27).

Preferably, the filling part contributes to 10 wt % to 40 wt % of the layered cookie, preferably to 15 wt % to 32 wt %, more preferably 25 wt % to 30 wt %.

The filling part may comprise at least one of the following ingredients: fat sugar, water, starch, emulsifier, milk and dairy derivatives, flavouring agents, fruit powder, fruit pieces, cocoa powder, chocolate drops, and seeds. Emulsifier can be at least one of the following: soya lecithin, diacetyl tartaric ester of monoglyceride, sodium stearyl lactylate.

When the filling part comprises non gelatinised added starch, non gelatinised added starch constitutes between 2.0 wt % to 40.0 wt % of the filling part, preferably between 7.0 to 22.0 wt % of the filling part.

Milk and dairy derivates can be whey powder, yoghurt powder (with living ferments), fresh milk, milk powder, sweet whey powder, milk proteins, and whey proteins.

Flavouring agent may be in a solid or liquid form.

Fruit powder is desiccated fruits that are pulverised such as strawberry, raspberry, raisin, fig, prune, orange, cranberry, blueberry, apricot, blackcurrant, redcurrant, peach, pear, kiwi, banana, apple, lemon, pineapple, tomato.

A healthy layered cookie comprises sugar that makes up to at most 27.5% of the total caloric value of the final product, fat that makes up to at most 38.0% of the total caloric value of the final product and available carbohydrate at least 55.0% of the total caloric value of the final product.

Due to the water loss of water naturally present in cereal flours on baking, the wt % values for the cereal content of the dough are substantially the same as the wt % values for the final biscuit. The moisture content of flours is typically 14 wt %, 10% for the bran-germs and 11% for the oat flakes.

According to a second aspect there is provided a method for forming a biscuit having a slowly-digestible-starch-over-total-available-starch ratio of at least 31%, the biscuit comprising at least 29 wt % cereal flour, 5 to 22 wt % fat and at most 30 wt % sugar relative to the total weight of the biscuit, the method comprising:
  providing the dough as described herein;
  moulding the dough into the shape of the biscuit; and
  baking the biscuit.

Preferably the method comprises:
  mixing E1' a cereal flour, fat, sugar and remaining ingredients with at most 8 wt % added water over the total weight of the dough for forming a dough 2;
  moulding E3' the dough 2 to shape the biscuits 3 of the biscuit part, wherein the moulding is preferably rotary moulding;
  baking E5' the biscuits of the biscuit part;
  Optionally forming E7'-E8' a layered cookie from at least one biscuit and a filling.

The moulding preferably compresses the dough to a pre-baking density of from 1.0 to 1.5 g/cm$^3$ as discussed herein.

Rotary moulding is the preferred technique for forming the biscuits because in principle there is no other technology that allows compliance with the criteria on slowly digestible starch. This is because other techniques cannot cope with such poorly hydrated doughs. It is speculated that the high pressure applied by the rotary moulding system permits the use of there dry and crumbly doughs. Moreover, by applying pressure, capillary bridges may form between the dough pieces, transforming the loosely connected particles into a cohesive although fragile pre-baking biscuit.

In principle, however, the forming step could be performed by passing the dough pieces through a so-called sheeter (compression cylinder) to produce a continuous layer of dough (thickness between 3 and 20 mm, preferably between 5 and 12 mm), then cutting the dough layer into smaller pieces of square or rectangular shape (the latter being similar in aspect to granola bars) that are then baked.

Mixing is preferably carried out in a horizontal mixer with double jacket. Mixing phases are adjusted so that water content is controlled. Preferably, the temperature of the dough is 15° C. to 35° C., more peferably 15° C. to 30° C. during mixing.

The present inventors have found that there is a particularly preferred order of mixing the ingredients that permits the use of doughs with even lower hydration levels.

The last ingredient to be added, if present, are flakes. These are added at the end of the process to reduce the risk of damaging the flakes and having a detrimental effect on their appearance. Furthermore, if the flakes are damaged then there is an increased risk of hydrolysing more of the flake starch content which would reduce the SAG of the biscuit as a whole.

In a flake-free composition the final ingredient to be added is flour or flours. When flakes are present, preferably the flour or flours is the penultimate ingredient added. By minimising the time that the flour is present in the mixture it has been found that the amount of water absorbed by the flour can be minimised. This has been found to reduce the amount of water that needs to be added to the mixture. This reduces the amount of water present to hydrolyse the starch and, as a result, the amount of SDS increases in the final product.

That is, the dough is preferably mixed in a multi-step process. In a first step, the ingredients, excluding the added water, cereal flour and wholegrain cereal flakes, if present, are mixed together. Then the added water is added, then the cereal flour is added, then the wholegrain cereal flakes, if present, are added.

By way of an example, in a first step, ingredients such as fat, cocoa powder, sugars, flavours, lecithin, salt, vitamins and sodium bicarbonate are blended together. In a second step, once the first mixture is thoroughly blended, the added water is introduced, together with an amount of ammonium bicarbonate. In a third step, flours and sodium pyrophosphate are added to the mixture. Finally flakes are added. The mixture is then moulded and formed into a biscuit as described herein.

With conventional rotary moulding apparatuses, it is difficult and sometime not possible to process such a granular dough. Therefore, a new specific rotary moulder was designed for the rotary moulding step.

This specific rotary moulder 1 (as illustrated in FIG. 3) comprises:
  a moulding cylinder 11 and a grooved cylinder 12 for shaping the dough 2 into the biscuit 3; and, optionally
  a hopper 13 playing the role of a funnel to help feed the moulding and grooved cylinders 11, 12; and/or
  a demoulding belt 14 for demoulding the biscuit 3.

The moulding cylinder 11 has mould cavities for receiving the dough 2. The mould cavities will give the dough 2 the shape of the biscuits 3 of the biscuit part. The grooved cylinder 12 preferably comprises grooves of 5 to 15 mm, preferably 10 mm±50% to allow sufficient stickiness of the dough without crushing solid pieces like flakes, and during operation presses the dough 2 that is received inside the mould cavities of the moulding cylinder 11 so that the dough completely filled the mould cavities and take the shape thereof. The grooved cylinder 12 is preferably mounted on a horizontal axis and can be adjusted thereon to vary the compression force applied to the dough 2. High compression should be used since the dough 2 lacks continuity, thus, cohesive dough pieces would be demouldable and transferrable from the demoulding belt 14 to the oven belt that drives the uncooked biscuit 3 into the oven for baking.

The difference of speed between the grooved cylinder 12 and the moulding cylinder 11 is preferably maintained less than 10% so that the formation of the biscuit 3 is not impaired. Indeed, a higher differential between both rotation speed of the moulding cylinder 11 and the grooved cylinder 12 will induce a shear stress on the dough 2 that will not be able to be pressed onto the mould cavities but will rather be spread and less packed between the circumferential faces of the moulding cylinder 11 and the grooved cylinder 12.

The level of dough 2 in the hopper 13 can be preferably controlled so that it is minimal and that the moulding and grooved cylinders 11, 12 are nearly visible. The aim is to prevent the dough 2 from compacting and thus, ensure regular feeding of the moulding cylinder 11 along the width of the demoulding belt 14. The dough 2 has to be the least packed as possible.

A cutter 15, with its tip 151 under the axis line AA of the moulding and grooved cylinders 11, 12, preferably cuts the dough 2 at the top of the mould cavities. The cutter 15 determines the quantity of dough 2 to remain inside the mould cavities, and makes it possible to adjust the weight of the dough pieces therein. Each dough piece forming an uncooked biscuit preferably weighs 0.5 gram to 40 grams, more preferably 1 gram to 35 grams, still more preferably 1 gram to 30 grams.

The demoulding belt 14, preferably made from cotton and/or polyamide, has weft with suitable dimension for extracting dough pieces drier than conventional dough, i.e. granular dough. The demoulding belt 14 is mounted on at least two cylinders 16, 17, one of which, generally a rubber cylinder 16, presses the moulding cylinder 11. Upon pressure of the rubber cylinder 16 onto the moulding cylinder 11, the dough pieces lying inside the mould cavities adhere to the demoulding belt 14 and are transported towards the oven for baking.

The rotary moulder 1 may further comprise a humidifier 18 for the demoulding belt 14, for example the humidifier 18 is a steaming device or a water-spraying device.

Resting time of the resting step E2' should be limited to avoid high dryness of the dough 2, which would require to further add water and thus would impede SAG content by triggering starch gelatinisation.

Before baking E5', the biscuits 3 can be glazed so that they gain a shiny appearance. Therefore, the method can comprise an optional additional step of glazing E4' the shaped biscuit 3. The biscuit 3 can be glazed with an aqueous glazing, preferably comprising milk powder and/or icing sugar and/or buffering agent such as sodium bicarbonate, sodium hydroxide. Preferably, the glazing comprises skimmed milk powder. Still preferably, the glazing comprises starchy icing sugar, i.e. sucrose natural sweetener characterised by its fine granulometry obtained by milling crystal sugar and added with starch as an anti-agglomerating agent.

Baking E5' is preferably carried out until the moisture content of the baked biscuit 3 (final product) is 0.5 wt % to 5.0 wt %, for example by gentle baking (i.e. baking temperature is below 110° C. inside the biscuit durhg the first third time of the baking—if baking time is 6 min, during 2 min—and preferably below 100° C.).

The baking conditions are preferably mild to minimise the gelatinisation of the starch and to maintain the highest possible SDS in the biscuit. Preferably the conditions in the baking step are especially mild at the beginning of the baking process while the heat dehydrates the biscuit. By using a low heat during this step the gelatinisation of the starch is minimised. Once the water in the biscuit has been reduced it is possible to use higher temperatures without significant gelatinisation. Preferably the baking is conducted so that the temperature of the biscuit is less than 110° C., preferably less than 100° C., and preferably at least 90° C., for the first two minutes of the time of baking. Preferably this temperature is maintained for the first two minutes or the first third of the baking time, whichever is longer. The time of baking is preferably less than 12 minutes, preferably from 4 to 8 minutes and most preferably from 6 to 8 minutes.

After baking, the baked biscuits are cooled down E6' on an open belt, i.e. a belt that is not covered, a cooling tunnel is preferably not used because there is a too big temperature differential between the input and the output, what causes checking (failure) on the biscuit 3. Then, the filling is deposited E7' on one biscuit (on the base biscuit for a filling-over-biscuit cookie or on one biscuit out of two for a sandwich cookie).

The water content of the final biscuit is preferably less than 3 wt % and preferably between 1 and 2 wt % of the final biscuit following baking.

The low water content helps to provide a long-term shelf stable product. For example, the present biscuits and sandwich-biscuits may be kept at 20-25° C. for up to one year while remaining edible. Shelf-life studies based on sensory expert panel evaluation have been conducted. It was found that the full sensory profile was maintained for up to 7 months to one year depending on the ingredients. Nevertheless, the edibility of the biscuits extended at least up to the one year mark.

In case the layered cookie is a sandwich cookie, then the sandwich cookie is made by assembling E8' the second biscuit on the top of the filling.

The layered cookie is cooled-down by forced-air in a cooling tunnel E9'. The layered cookies are then packaged E10', for example layered cookies are packaged into wrappers containing 50 g of layered cookies and the wrappers are gathered in a packet that is designed to contain 5 or 6 wrappers. Preferably, the layered cookies can be packaged in wrappers so that one wrapper contains one serving, for example two sandwich cookies.

The disclosure also concerns a ready-to-eat layered cookie obtainable by the method described above. Preferably, the layered cookie further comprises at least 18 wt % total starch over the total weight of the layered cookie.

The disclosure will now be described in relation to the figures, provided by way of non-limiting example, in which.

Figure 1:
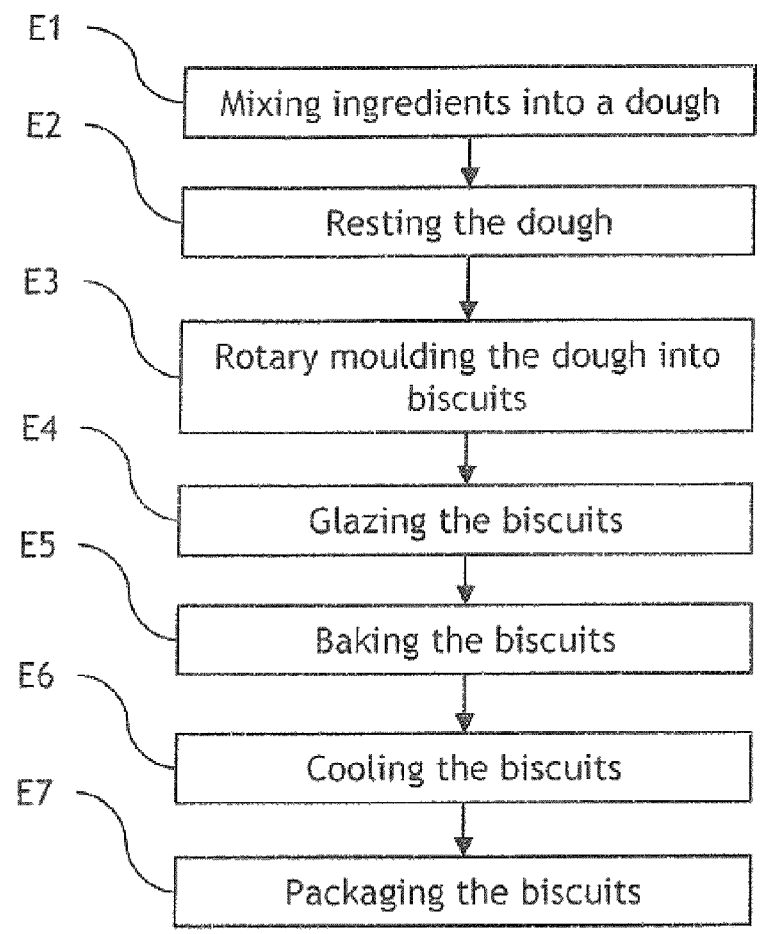
FIG. 1 is a flowchart showing the different steps of a method for forming a biscuit.

As a key to FIG. 1:
E1: Mixing the ingredients
E2: Resting the dough

Figure 2:
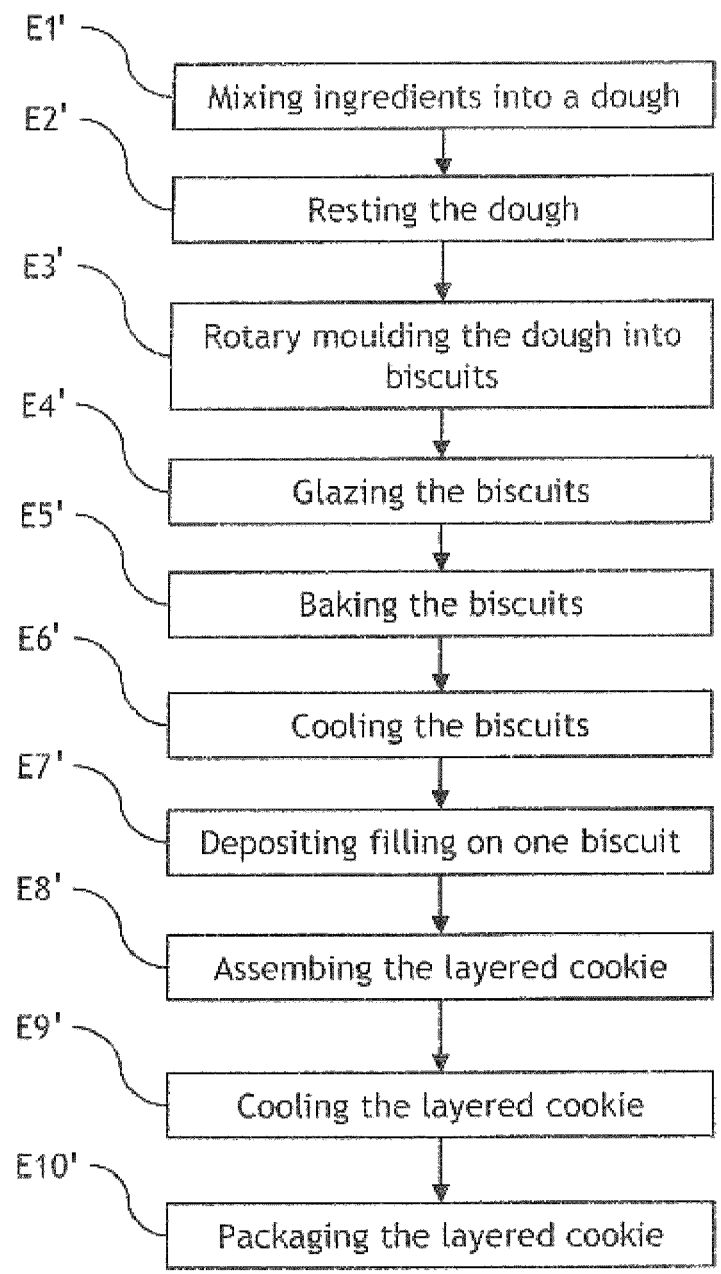
FIG. 2 is a flowchart showing the different steps of a method for forming a layered cookie.
Figure 3:
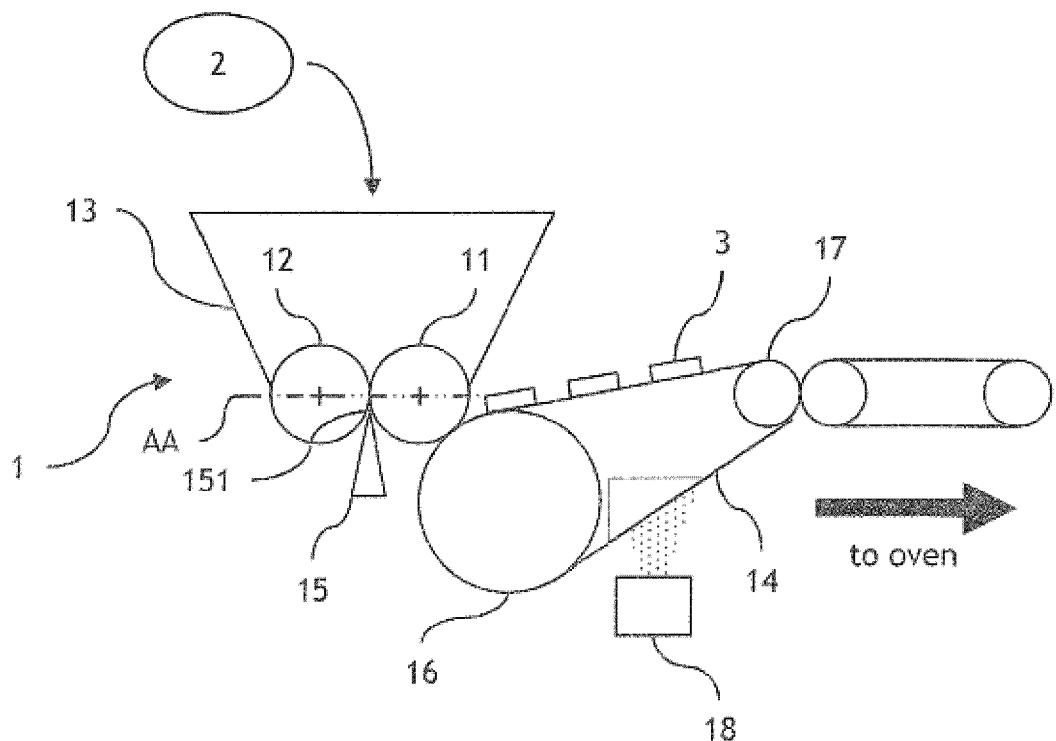
FIG. 3 is a schematic representation of a rotary moulder. The large arrow indicates the direction to the oven.
Figure 4:
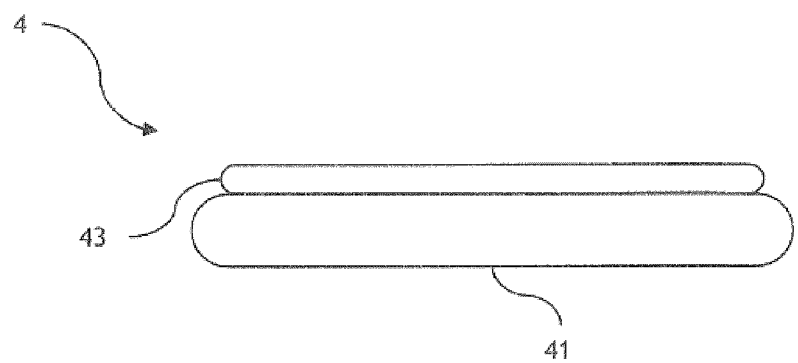
FIG. 4 is a schematic representation of a filling-over-biscuit cookie.
Figure 5:
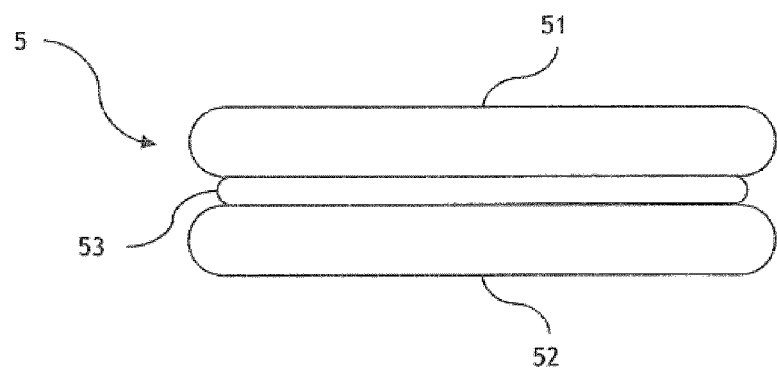
FIG. 5 is a schematic representation of a sandwich cookie.

E3: Rotary moulding the dough into biscuits
E4: Glazing the biscuits
E5: Baking the biscuits
E6: Cooling the biscuits
E7: Packaging the biscuits
As a key to FIG. 2:
E1': Mixing the ingredients into a dough
E2': Resting the dough
E3': Rotary moulding the dough into biscuits
E4': Glazing the biscuits
E5': Baking the biscuits
E6': Cooling the biscuits
E7': Depositing filing on one biscuit
E8': Assembling the layered cookie
E9': Cooling the layered cookie
E10': Packaging the layered cookie The disclosure will now be described in relation to the following non-limiting examples.

EXAMPLES OF BISCUITS

Example 1

A plain Cocoa biscuit was prepared. The biscuit has the following composition (in percentage of the final biscuit):

| dough ingredients | 115.41 wt % |
|---|---|
| glazing ingredients | 1.69 wt % |
| water removal | −17.10 wt % |
| total | 100 wt % |

More particularly, biscuits are produced from dough formed with the following recipes:

| Ingredient | Wt % in dough | Wt % in Biscuit |
|---|---|---|
| Refined soft wheat flour | 29.4 | 29.2 |
| Wheat bran and germ | 3.0 | 3.1 |
| Whole grain spelt flour | 0.91 | 0.90 |
| Whole grain rye flour | 2.9 | 2.9 |
| Whole grain barley flour | 5.6 | 5.5 |
| Whole grain oat flakes | 7.7 | 7.8 |
| SUGARS | 16.5 | 19.0 |
| FAT | 10.2 | 11.8 |
| ADDED WATER | 7.6 | 2.0 |
| Cocoa powder | 3.0 | 3.3 |
| Chocolat drop | 11.3 | 13.0 |
| Flavouring powder | 0.27 | 0.31 |
| Emulsifier | 0.33 | 0.38 |
| Salt | 0.25 | 0.29 |
| Leavening agents | 0.80 | 0.18 |
| Vitamin and mineral lend | 0.16 | 0.18 |
| Total | 100.0 | 100.0 |
| Relative total wt % after baking | 86.8 | |

(amounts are expressed in percentage with respect to the weight of, respectively, final biscuit and unbaked dough)

The water absorption measured by Brabender® Farinograph® of the refined wheat flour is 52%.

The ingredients of the dough are mixed together in a horizontal mixer until the dough gets a homogenised consistency. Then the dough is rested for 30 minutes. After resting, the dough is fed into the hopper of the rotary moulder for forming the biscuits. The dough is fed so that the moulding and grooved cylinders of the rotary moulder are nearly visible. The speed differential of the moulding and grooved cylinder is kept below 10%. The biscuits are then glazed with a glazing that comprises (in weight percentage of the final biscuit):

| water | 1.48 wt % |
|---|---|
| skimmed milk powder | 0.169 wt % |
| starchy icing sugar | 0.0425 wt %. |

After glazing the biscuits are driven to the oven for baking for about 7 min. During baking the temperature of the dough remains under 160° C. at all times. At the end of baking the water content is about 2.0 wt %.

When the biscuits are taken out from the oven, they are allowed to cool down on open belts until the temperature of the biscuits is below 30° C. for packing.

The biscuit comprises 57.15 wt % cereal ingredients, more in particular 31.19 wt % wholegrain cereal flour representing 64.55% of the total cereal flour. The biscuit has 17.1 wt % fat and 27.1 wt % sugar. Fat represents 35% of the total caloric value of the biscuit, while carbohydrate represents 58% and more precisely, sugar represents 24%. The biscuit has a SDS/(RDS+SDS) ratio of 40.75% and 16.3 g SAG/100 g biscuit. The biscuit has a starch content of 36.5 wt %.

Example 2

The biscuit has the following composition (in percentage of the final biscuit):

| dough ingredients | 112.46 wt % |
|---|---|
| glazing ingredients | 1.69 wt % |
| water removal | −14.15 wt % |
| total | 100 wt % |

More particularly, biscuits are produced from dough formed with the following recipes:

| Ingredient | Wt % in dough | Wt % in Biscuit |
|---|---|---|
| Refined soft wheat flour | 32.3 | 31.1 |
| Wheat bran and germ | 3.1 | 3.1 |
| Whole grain spelt flour | 0.89 | 0.86 |
| Whole grain rye flour | 3.1 | 3.0 |
| Whole grain barley flour | 4.4 | 4.2 |
| Whole grain oat flakes | 9.5 | 9.5 |
| SUGARS | 16.6 | 18.6 |
| FAT | 12.2 | 13.6 |
| ADDED WATER | 4.5 | 1.5 |
| Honey (dry) | 4.5 | 4.9 |
| Chocolate drop | 7.7 | 8.6 |
| Flavouring powder | 0.29 | 0.32 |
| Emulsifier | 0.15 | 0.17 |
| Salt | 0.26 | 0.29 |
| Leavening agents | 0.44 | 0.10 |
| Vitamin and mineral lend | 0.15 | 0.17 |
| Total | 100.00 | 100.00 |
| Relative total wt % after baking | 89.3 | |

(amounts are expressed in percentage with respect to the weight of, respectively, final biscuit and unbaked dough).

The water absorption value measured by Brabender® Farinograph® of the refined wheat flour is 53%.

The ingredients of the dough are mixed together in a horizontal mixer until the dough gets a homogenised consistency. Then the dough is rested. After resting, the dough is fed into the hopper of the rotary moulder for forming the biscuits. The dough is fed so that the moulding and grooved cylinders of the rotary moulder are nearly visible. The speed differential of the moulding and grooved cylinder is kept below 10%. The biscuits are then glazed with a glazing that comprises (in weight percentage of the final biscuit):

| | |
|---|---|
| water | 1.47 wt % |
| skimmed milk powder | 0.170 wt % |
| starchy icing sugar | 0.040 wt %. |

After glazing the biscuits are driven to the oven for baking for about 7 min. During baking the temperature of the dough remains under 160° C. and the water content decreases until it reaches 1.5 wt %.

When the biscuits are taken out from the oven, they are allowed to cool down on open belts until the temperature of the biscuits is below 30° C. for packing.

The biscuit comprises 56.4 wt % cereal ingredients, more in particular 29.66 wt % wholegrain cereal flour representing 60.34% of the total cereal flour. The biscuit has 17.24 wt % fat and 24.56 wt % sugar. Fat represents 34% of the total caloric value of the biscuit, while carbohydrate represents 60% and more precisely, sugar represents 22%. The biscuit has a SDS/(RDS+SDS) ratio of 44.18% and 18.6 g SAG/100 g biscuit. The biscuit has a starch content of 38.1 wt %.

EXAMPLES OF SANDWICH COOKIES

Example 1

A sandwich cookie has the following composition (in percentage of the final cookie):

| | |
|---|---|
| dough ingredients | 87.12 wt % |
| glazing ingredients | 3.02 wt % |
| filling ingredients | 28.00 wt % |
| water removal | −18.14 wt % |
| total | 100 wt % |

More particularly, the biscuits of the sandwich cookie are produced from dough formed with the following recipes:

| Ingredient | Wt % in dough | Wt % in Biscuit |
|---|---|---|
| Refined soft wheat flour | 48.7 | 49.4 |
| sugar | 16.0 | 18.9 |
| wholegrain cereal flour (rye, barley, spelt) | 3.6 | 3.7 |
| wheat bran and wheat germ | 2.4 | 2.6 |
| oat flakes | 10.5 | 11.0 |
| FAT | 10.1 | 11.9 |
| ADDED WATER | 6.8 | 1.0 |
| Flavouring powder | 0.33 | 0.39 |
| Emulsifier | 0.12 | 0.14 |
| Salt | 0.21 | 0.25 |
| Leavening agents | 0.74 | 0.17 |
| Vitamin and mineral lend | 0.50 | 0.59 |
| Total | 100.00 | 100.00 |
| Relative total wt % after baking | 84.8 | |

(Amounts are expressed in percentage with respect to the weight of, respectively, final biscuit and unbaked dough.)

The refined soft wheat flour used in example 1 has a water absorption value as measured with Brabender® Farinograph® of 53-54%.

The ingredients of the dough are mixed together in a horizontal mixer until the dough gets a homogenised consistency. Then the dough is rested. After resting, the dough is fed into the hopper of the rotary moulder for forming the biscuits. The dough is fed so that the moulding and grooved cylinders of the rotary moulder are nearly visible. The speed differential of the moulding and grooved cylinder is kept below 10%. The biscuits are then glazed with a glazing that comprises (in weight percentage of the final biscuit):

| | |
|---|---|
| water | 2.68 wt % |
| skimmed milk powder | 0.27 wt % |
| refined sugar powder | 0.07 wt % |
| total | 3.02 wt %. |

After glazing the biscuits are driven to the oven for baking for about 6 min. During baking the temperature of the dough remains under 160° C. and the water content decreases until it reaches 1%.

When the biscuits are taken out from the oven, they are allowed to cool down on open belts. Once the temperature of the biscuits is below 33° C. the biscuits are then assembled with a filling to form sandwich cookies. The filling has the following composition:

| | |
|---|---|
| sugar | 14.26 wt % |
| wheat starch | 1.93 wt % |
| emulsifier | 0.08 wt % |
| flavouring agent | 0.04 wt % |
| cocoa powder | 4.31 wt % |
| fat | 7.38 wt % |
| total | 28.00 wt %. |

The sandwich cookie has 18.08 wt % fat and 26.5 wt % sugar. Fat represents 35.7% of the total caloric value of the sandwich cookie, while carbohydrate represents 57% and more precisely, sugar represents 23%. The sandwich cookie has a SDS/(RDS+SDS) ratio of 39.95% and 16.5 g SAG/100 g sandwich cookie.

Comparative Example 1

The sandwich cookie for the comparative example 1 has the following composition (in percentage of the final cookie):

| | |
|---|---|
| dough ingredients | 87.30 wt % |
| glazing ingredients | 3.02 wt % |
| filling ingredients | 28.00 wt % |
| water removal | −18.32 wt % |
| total | 100 wt % |

More particularly, the biscuits of the sandwich cookie are produced from dough formed with the following recipes:

| Ingredient | Wt % in dough | Wt % in Biscuit |
|---|---|---|
| Wheat flour | 47.5 | 49.7 |
| sugar | 15.5 | 18.9 |
| wholegrain cereal flour (rye, barley, spelt) | 3.5 | 3.7 |
| wheat bran and wheat germ | 2.1 | 2.3 |
| oat flakes | 10.2 | 11.0 |

-continued

| Ingredient | Wt % in dough | Wt % in Biscuit |
|---|---|---|
| FAT | 9.8 | 11.9 |
| ADDED WATER | 9.7 | 1.0 |
| Flavouring powder | 0.32 | 0.39 |
| Emulsifier | 0.12 | 0.15 |
| Salt | 0.18 | 0.22 |
| Leavening agents | 0.72 | 0.18 |
| Vitamin and mineral lend | 0.48 | 0.58 |
| Total | 100.00 | 100.00 |
| Relative total wt % after baking | 82.1 | |

(Amounts are expressed in percentage with respect to the weight of, respectively, final biscuit and unbaked dough)

The amount of the various ingredients is actually the same as in example 1, only more water is added into the dough, thus changing the percentage for all ingredients. Another difference is the use of refined wheat flour in example 1, whereas in the comparative example 1, conventional soft wheat flour is used.

This soft wheat flour has a water absorption value as measured with Brabender® Farinograph® of 58-59%.

The ingredients of the dough are mixed together in a horizontal mixer until the dough gets a homogenised consistency. Then the dough is rested. After resting, the dough is fed into the hopper of an ordinary rotary moulder for forming the biscuits. The speed differential of the moulding and grooved cylinder is kept below 10%. The biscuits are then glazed with a glazing that comprises (in weight percentage of the final biscuit):

| water | 2.68 wt % |
|---|---|
| skimmed milk powder | 0.27 wt % |
| refined sugar powder | 0.07 wt % |
| total | 3.02 wt %. |

After glazing the biscuits are driven to the oven for baking for about 6 min. During baking the temperature of the dough remains under 160° C. and the water content decreases until it reaches 1%.

When the biscuits are taken out from the oven, they are allowed to cool down on open belts. Once the temperature of the biscuits is below 33° C. the biscuits are then assembled with a filling to form sandwich cookies. The filling has the following composition:

| sugar | 14.26 wt % |
|---|---|
| wheat starch | 1.93 wt % |
| emulsifier | 0.08 wt % |
| flavouring agent | 0.04 wt % |
| cocoa powder | 4.31 wt % |
| fat | 7.38 wt % |
| total | 28.00 wt %. |

This sandwich cookie has 29.7% SDS/(RDS+SDS) and 12.5 g/100 g sandwich cookie of SAG. Thus, SAG content for this sandwich cookie is much less than 15 g/100 g sandwich cookie. This shows that the change in dough recipe and in use of a different rotary moulder result in sandwich cookies with better SAG content.

Also, use of refined wheat flour in example 1 enables diminution of added water content in the dough down to less than 8 wt % of the dough. It is believed that this makes it possible to better protect the starch from gelatinisation and therefore preserve a high amount of SDS.

Example 2

The sandwich cookie has the following composition (in percentage of the final cookie):

| dough ingredients | 87.60 wt % |
|---|---|
| glazing ingredients | 3.01 wt % |
| filling ingredients | 28.00 wt % |
| water removal | −18.62 wt % |
| total | 100 wt % |

More particularly, the biscuits of the sandwich cookie are produced from dough formed with the following recipes:

| Ingredient | Wt % in dough | Wt % in Biscuit |
|---|---|---|
| refined soft wheat flour | 48.7 | 49.6 |
| sugar | 15.9 | 18.9 |
| wholegrain cereal flour (rye, barley, spelt) | 3.6 | 3.6 |
| wheat bran and wheat germ | 2.4 | 2.6 |
| oat flakes | 10.4 | 11.0 |
| FAT | 10.1 | 11.9 |
| ADDED WATER | 7.2 | 1.0 |
| Flavouring powder | 0.33 | 0.39 |
| Emulsifier | 0.12 | 0.14 |
| Salt | 0.21 | 0.25 |
| Leavening agents | 0.76 | 0.18 |
| Vitamin and mineral lend | 0.37 | 0.44 |
| Total | 100.00 | 100.00 |
| Relative total wt % after baking | 84.4 | |

(Amounts are expressed in percentage with respect to the weight of, respectively, final biscuit and unbaked dough.)

The refined soft wheat flour used in example 2 has a water absorption value as measured with Brabender® Farinograph® of 53-54%.

The ingredients of the dough are mixed together in a horizontal mixer until the dough gets a homogenised consistency. Then the dough is rested. After resting, the dough is fed into the hopper of the rotary moulder for forming the biscuits. The dough is fed so that the moulding and grooved cylinders of the rotary moulder are nearly visible. The speed differential of the moulding and grooved cylinder is kept below 10%. The biscuits are then glazed with a glazing that comprises (in weight percentage of the final biscuit):

| water | 2.68 wt % |
|---|---|
| skimmed milk powder | 0.27 wt % |
| refined sugar powder | 0.07 wt % |
| total | 3.01 wt %. |

After glazing the biscuits are driven to the oven for baking for about 6 min. During baking the temperature of the dough remains under 160° C. and the water content decreases until it reaches 1%.

When the biscuits are taken out from the oven, they are allowed to cool down on open belts. Once the temperature of the biscuits is below 33° C. the biscuits are then assembled with a filling to form sandwich cookies. The filling has the following composition:

| | |
|---|---|
| dairy derivatives (whey, yoghurt) | 4.48 wt % |
| wheat starch | 5.60 wt % |
| sugar | 10.07 wt % |
| emulsifier | 0.07 wt % |
| flavouring agent (yoghurt) | 0.06 wt % |
| acidifying agent | 0.02 wt % |
| fat | 7.70 wt % |
| total | 28.00 wt %. |

The sandwich cookie has 17.62 wt % fat and 28.3 wt % sugar. Fat represents 34.8% of the total caloric value of the sandwich cookie, while carbohydrate represents 59% and more precisely, sugar represents 25%. The sandwich cookie has a SDS/(RDS+SDS) ratio of 43.38% and 19 g SAG/100 g sandwich cookie.

Comparative Example 2

The sandwich cookie for the comparative example 1 has the following composition (in percentage of the final cookie):

| | |
|---|---|
| dough ingredients | 87.80 wt % |
| glazing ingredients | 3.01 wt % |
| filling ingredients | 28.00 wt % |
| water removal | −18.81 wt % |
| total | 100 wt % |

More particularly, the biscuits of the sandwich cookie are produced from dough formed with the following recipes:

| Ingredient | Wt % in dough | Wt % in Biscuit |
|---|---|---|
| wheat flour | 46.8 | 49.4 |
| sugar | 15.4 | 18.9 |
| wholegrain cereal flour (rye, barley, spelt) | 3.5 | 3.6 |
| wheat bran and wheat germ | 2.3 | 2.6 |
| oat flakes | 10.1 | 11.0 |
| FAT (vegetable fat) | 9.7 | 11.9 |
| ADDED WATER | 10.2 | 1.0 |
| Flavouring powder (yoghurt) | 0.31 | 0.38 |
| Emulsifier | 0.12 | 0.15 |
| Salt | 0.20 | 0.25 |
| Leavening agents | 1.02 | 0.25 |
| Vitamin and mineral lend | 0.36 | 0.44 |
| Total | 100.00 | 100.00 |
| Relative total wt % after baking | 81.8 | |

(Amounts are expressed in percentage with respect to the weight of, respectively, final biscuit and unbaked dough.)

The amount of the various ingredients is actually the same as in example 2, only more water is added into the dough, thus changing the percentage for all ingredients. Another difference is the use of refined wheat flour in example 2, whereas in the comparative example 2, conventional soft wheat flour is used. This soft wheat flour has a water absorption value as measured with Brabender® Farinograph® of 58-59%.

The ingredients of the dough are mixed together in a horizontal mixer until the dough gets a homogenised consistency. Then the dough is rested. After resting, the dough is fed into the hopper of an ordinary rotary moulder for forming the biscuits. The speed differential of the moulding and grooved cylinders is kept below 10%. The biscuits are then glazed with a glazing that comprises (in weight percentage of the final biscuit):

| | |
|---|---|
| water | 2.68 wt % |
| skimmed milk powder | 0.27 wt % |
| refined sugar powder | 0.07 wt % |
| total | 3.01 wt %. |

After glazing the biscuits are driven to the oven for baking for about 6 min. During baking the temperature of the dough remains under 160° C. and the water content decreases until it reaches 1%.

When the biscuits are taken out from the oven, they are allowed to cool down on open belts. Once the temperature of the biscuits is below 33° C. the biscuits are then assembled with a filling to form sandwich cookies. The filling has the following composition:

| | |
|---|---|
| dairy derivatives (whey, yoghurt) | 4.48 wt % |
| wheat starch | 5.60 wt % |
| sugar | 10.07 wt % |
| emulsifier | 0.07 wt % |
| flavouring agent (yoghurt) | 0.06 wt % |
| acidifying agent | 0.02 wt % |
| fat | 7.70 wt % |
| total | 28.00 wt %. |

This sandwich cookie has 28.5% SDS/(RDS+SDS) and 12.3 g/100 g sandwich cookie of SAG. Thus, SAG content for this sandwich cookie is much less than 15 g/100 g sandwich cookie. This shows again that the change in dough recipe and in use of a different rotary moulder result in sandwich cookies with better SAG content.

Also, use of refined wheat flour in example 1 enables diminution of added water content in the dough down to less than 8 wt % of the dough. It is believed that this makes it possible to better protect the starch from gelatinisation and therefore preserve a high amount of SDS.

Example 3

The sandwich cookie has the following composition (in percentage of the final cookie):

| | |
|---|---|
| dough ingredients | 90.39 wt % |
| glazing ingredients | 1.90 wt % |
| filling ingredients | 27.00 wt % |
| water removal | −19.29 wt % |
| total | 100 wt % |

More particularly, the biscuits of the sandwich cookie are produced from dough formed with the following recipes:

| Ingredient | Wt % in dough | Wt % in Biscuit |
|---|---|---|
| refined soft wheat flour | 49.5 | 50.9 |
| sugar | 13.9 | 16.7 |
| wholegrain cereal flour (rye, barley, spelt) | 5.8 | 5.9 |
| wheat bran and wheat germ | 2.0 | 2.2 |
| oat flakes | 7.8 | 8.3 |
| FAT (vegetable fat) | 11.0 | 13.2 |
| ADDED WATER | 7.8 | 1.1 |
| Flavouring powder (yoghurt) | 0.23 | 0.27 |
| Emulsifier | 0.29 | 0.35 |
| Salt | 0.20 | 0.24 |

| Ingredient | Wt % in dough | Wt % in Biscuit |
|---|---|---|
| Leavening agents | 0.75 | 0.18 |
| Vitamin and mineral lend | 0.55 | 0.66 |
| Total | 100.00 | 100.00 |
| Relative total wt % after baking | | 83.7 |

(Amounts are expressed in percentage with respect to the weight of, respectively, final biscuit and unbaked dough)

The water absorption value measured by Brabender® Farinograph® of the refined wheat flour is 53-54%.

The ingredients of the dough are mixed together in a horizontal mixer until the dough gets a homogenised consistency. Then the dough is rested. After resting, the dough is fed into the hopper of the rotary moulder for forming the biscuits. The dough is fed so that the moulding and grooved cylinders of the rotary moulder are nearly visible. The speed differential of the moulding and grooved cylinder is kept below 10%. The biscuits are then glazed with a glazing that comprises (in weight percentage of the final biscuit):

| water | 1.69 wt % |
|---|---|
| skimmed milk powder | 0.17 wt % |
| refined sugar powder | 0.04 wt % |
| total | 1.90 wt %. |

After glazing the biscuits are driven to the oven for baking for about 7 min. During baking the temperature of the dough remains under 160° C. and the water content decreases until it reaches 1.1%.

When the biscuits are taken out from the oven, they are allowed to cool down on open belts. Since the temperature of the biscuits is below 33° C. the biscuits are then assembled with a filling to form sandwich cookies. The filling has the following composition:

| sugar | 16.47 wt % |
|---|---|
| moisturising agent | 6.75 wt % |
| vegetable fat | 1.62 wt % |
| fruit concentrate | 1.35 wt % |
| gums | 0.27 wt % |
| acidity regulator | 0.38 wt % |
| emulsifier | 0.11 wt % |
| flavouring agent (mixed berry) | 0.05 wt % |
| total | 27.00 wt %. |

The sandwich cookie has 12.05 wt % fat and 29.3 wt % sugar. Fat represents 26% of the total caloric value of the sandwich cookie, while carbohydrate represents 68% and more precisely, sugar represents 27.7%. The sandwich cookie has a SDS/(RDS+SDS) ratio of 35.07% and 15.5 g SAG/100 g sandwich cookie.

Dough Properties

The density of the dough in the moulds used to form the biscuits was quantified by calculating the density, i.e. the mass per unit volume, of the dough in the rotary mould. This is done by dividing the weight of a dough piece (straight after rotary molding) by the volume of the rotary mould.

| | Die volume (cm3) | Dough weight (g) | Density (g/cm3) |
|---|---|---|---|
| Plain Biscuit | 11.324 | 14.5 | 1.280 |
| Sandwich Biscuit | 8.56 | 11.0 | 1.285 |

The density values of further samples were measured and ranged from 1.20 to 1.29 g/ml.

The dough properties of the samples were also subjected to compression testing and sieving testing according to the test methods described herein. In particular, the pressure required to achieve a density of 1.22 g/cm$^3$ was measured and the particle size distributions were observed.

| | | | Rheology | | | Sieving | |
|---|---|---|---|---|---|---|---|
| Dough | | Rest time | Temp (° C.) | Force (kg) | Pressure (kg/m$^2$) | % <10 mm | D10 (mm) |
| Biscuit | Ex 1 | 0 h 30 | 30° C. | 12.97 | 6625 | 63% | 1.25 |
| Biscuit | Ex 1 | 2 h 30 | 30° C. | 19.1 | 9728 | 84% | 0.95 |
| Biscuit | Ex 1 | 2 h 30 | 20° C. | 29.3 | 14922 | 78% | 0.95 |
| Biscuit | Ex 2 | 0 h 30 | 24.5° C. | 10.8 | 5500 | 29% | 5.25 |
| Biscuit | Ex 2 | 2 h 30 | 24.5° C. | 12.8 | 6519 | 25% | 4.50 |
| Biscuit | Ex 2 | 2 h 30 | 24.5° C. | 11.8 | 6010 | | |
| Biscuit | Ex 2 | 2 h 20 | 24.5° C. | 13.8 | 7028 | | |
| Sandwich | Ex 2 | 1 h | 25° C. | 14.5 | 7385 | 32% | 3.50 |
| Sandwich | Comp Ex 2 | 1 h | 25° C. | 5.0 | 2546 | 4% | >10 |

% <10 mm refers to the amount of dough that goes through the 10 mm sieve. It is calculated as follows: % 10 mm = 100 − % dough mass on 10 mm sieve. % <2 mm refers to the amount of dough that goes through the 2 mm sieve. This amount can simply be measured and the % determined.

Unless otherwise stated, the percentage values recited herein are by weight and, where appropriate, by weight of the final biscuit.

Although preferred embodiments of the disclosure have been described herein in detail, it will be understood by those skilled in the art that variations may be made thereto without departing from the scope of the disclosure or of the appended claims.

We claim:

1. A dough for producing a biscuit having a slowly-digestible-starch-over-total-available-starch ratio of at least 31% and a slowly available glucose value of at least 15.0 g/100 g of the biscuit, the biscuit comprising at least 29 wt % cereal flour, 5 to 22 wt % fat and at most 30 wt % sugar relative to the total weight of the biscuit, the dough comprising:
   cereal flour, fat, sugar and added water;
   wherein the added water is in an amount of at most 8 wt % relative to the weight of dough; and
   wherein the cereal flour comprises a refined cereal flour having a water absorption under 55% as measured according to NF-ISO-5530-1 and the refined cereal flour forms at least 14.5 wt % of the biscuit.

2. The dough according to claim 1, wherein the added water is in an amount of from 3 to 7 wt % relative to the weight of dough.

3. The dough according to claim 1, having a pre-baking density of from 1.0 to 1.5 g/cm$^3$.

4. The dough according to claim 1, wherein the refined cereal flour comprises wheat flour comprising soft wheat flour, wheat flour with low damaged starch, thermally treated wheat flour, or combinations of two or more thereof.

5. The dough according to claim 1 for forming a biscuit comprising at most 19 wt % wholegrain cereal flakes by weight of the biscuit.

6. The dough according to claim 1, wherein the dough has a particle size distribution such that at least 20 wt % of the dough passes through a vibrating sieve mesh of 10 mm.

7. The dough according to claim 1, wherein the dough has a particle size distribution such that at least 8 wt % of the dough passes through a vibrating sieve mesh of 2 mm.

8. The dough according to claim 1, wherein the dough has a particle size distribution such that the D10 of the dough mass distribution is at most 6 mm.

9. The dough according to claim 1, wherein the dough requires a pressure of at least 5000 kg/m$^2$ to compress the dough to a density of 1.22 g/cm$^3$.

10. The dough according to claim 1, wherein the pressure required to compress the dough to a density of 1.22 g/cm$^3$ is from 6500 to 30000 kg/m$^2$.

11. The dough according to claim 1, wherein the dough comprises at least about 29 wt % cereal flour, about 4 to about 20 wt % fat and at most about 27 wt % sugar.

12. A method for forming a biscuit having a slowly-digestible-starch-over-total-available-starch ratio of at least 31%, the biscuit comprising at least 29 wt % cereal flour, 5 to 22 wt % fat and at most 30 wt % sugar relative to the total weight of the biscuit, the method comprising:
   providing the dough according to claim 1;
   moulding the dough into the shape of the biscuit; and
   baking the biscuit.

13. The method according to claim 12, wherein the step of moulding the dough involves compressing the dough to a pre-baking density of from 1.0 to 1.5 g/cm$^3$.

14. The method according to claim 12, wherein the baking is:
   (i) conducted for a time of from 4 to 12 minutes; and/or
   (ii) conducted so that the temperature within the biscuit does not exceed 110° C., within the first 2 minutes of baking.

15. The method according to claim 12, wherein the dough is mixed in a multi-step process and wherein:
   ingredients, excluding the added water, the cereal flour and wholegrain cereal flakes, if present, are mixed together,
   then the added water is added;
   then the cereal flour is added;
   then the wholegrain cereal flakes, if present, are added.

16. The method according to claim 12, wherein the step of moulding is a step of rotary moulding.

17. The method according to claim 16, wherein the rotary moulding is performed with a rotary moulder comprising:
   (i) a moulding cylinder and a grooved cylinder for shaping the dough into the biscuits, the moulding cylinder receiving the dough and the grooved cylinder with grooves of 5 to 15 mm, preferably 10 mm, pressing the dough in the moulding cylinder; and, optionally
   (ii) a hopper as a funnel for feeding the moulding and grooved cylinders; and/or
   (iii) a demoulding belt for demoulding the biscuits, optionally further comprising a humidification system;
   wherein the difference of speed between the grooved cylinder and the moulding cylinder is preferably maintained under 10%.

18. The method according to claim 12, wherein the method further comprises a step of forming a layered cookie by providing the biscuit with a filling part and, optionally, at least one further biscuit part.

19. The method according to claim 18, wherein the layered cookie contains 10 wt % to 25 wt % fat and 15 wt % to 40 wt % sugar relative to the total weight of the layered cookie.

20. A biscuit or filled cookie having a slowly-digestible-starch-over-total-available-starch ratio of at least 31%, the biscuit or filled cookie comprising at least 29 wt % cereal flour, 5 to 22 wt % fat and at most 30 wt % sugar relative to the total weight of the biscuit or filled cookie, prepared by a method comprising:
   providing the dough according to claim 1;
   moulding the dough into the shape of the biscuit or filled cookie; and
   baking the dough.

21. The biscuit or filled cookie according to claim 20, wherein the biscuit has a slowly available glucose value of at least 16.5 g/100 g of the biscuit or filled cookie.

22. The biscuit or filled cookie according to claim 20, wherein the biscuit has a slowly available glucose value of at least 18.0 g/100 g of the biscuit or filled cookie.

23. The biscuit or filled cookie according to claim 20, wherein the biscuit has a slowly available glucose value of at least 21.0 g/100 g of the biscuit or filled cookie.

24. The dough according to claim 1, wherein the dough has a particle size distribution such that at least 30 wt % of the dough passes through a vibrating sieve mesh of 10 mm.

* * * * *